US012607947B2

(12) United States Patent
Tanaka et al.

(10) Patent No.: US 12,607,947 B2
(45) Date of Patent: Apr. 21, 2026

(54) ELECTROSTATIC CHARGE IMAGE DEVELOPING TONER SET, ELECTROSTATIC CHARGE IMAGE DEVELOPER SET, TONER CARTRIDGE SET, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Tomoaki Tanaka, Kanagawa (JP); Kotaro Yoshihara, Kanagawa (JP); Asafumi Fujita, Kanagawa (JP); Teppei Yawada, Kanagawa (JP); Tsuyoshi Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 452 days.

(21) Appl. No.: 18/190,076

(22) Filed: Mar. 25, 2023

(65) Prior Publication Data

US 2024/0085814 A1 Mar. 14, 2024

(30) Foreign Application Priority Data

Sep. 12, 2022 (JP) ................................. 2022-144897

(51) Int. Cl.
*G03G 9/08* (2006.01)
*G03G 9/09* (2006.01)
*G03G 15/01* (2006.01)

(52) U.S. Cl.
CPC ......... *G03G 9/0821* (2013.01); *G03G 9/0902* (2013.01); *G03G 9/0918* (2013.01); *G03G 15/0121* (2013.01); *C08F 2800/20* (2013.01)

(58) Field of Classification Search
CPC .. G03G 9/0821; G03G 9/0902; G03G 9/0918; G03G 15/0121; C08F 2800/20
See application file for complete search history.

(56) References Cited

U.S. PATENT DOCUMENTS 9,529,288 B1 * 12/2016 Sugawara ................ G03G 9/08
9,946,182 B2 4/2018 Murakami et al.
(Continued)

FOREIGN PATENT DOCUMENTS

JP 2011150257 8/2011
JP 2015230434 12/2015
(Continued)

OTHER PUBLICATIONS

"Search Report of Europe Counterpart Application", issued on Jan. 24, 2024, p. 1-p. 7.

*Primary Examiner* — David H Banh
(74) *Attorney, Agent, or Firm* — JCIPRNET

(57) ABSTRACT

An electrostatic charge image developing toner set contains a white toner that contains white toner particles including a binder resin, a white colorant, and a release agent, and a non-white color toner that contains color toner particles including a binder resin, a color colorant, and a release agent, in which, in observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_H$, and a case where a proportion of an area of a domain of a release agent present in a surface layer region from a surface of the color toner particles to a depth of 1 μm or less with respect to an area of all domains of the release agent present in a cross (Continued)

section of the color toner particles is represented by $W_C$, a relationship of $W_C < W_W$ is satisfied.

20 Claims, 2 Drawing Sheets

(56) References Cited

U.S. PATENT DOCUMENTS

| | | |
|---|---|---|
| 10,670,983 B2 | 6/2020 | Taguchi et al. |
| 2016/0054669 A1 | 2/2016 | Hori et al. |
| 2018/0004108 A1* | 1/2018 | Tsuda ................. G03G 9/08795 |
| 2018/0275541 A1* | 9/2018 | Sato .................... G03G 9/0819 |
| 2018/0314175 A1 | 11/2018 | Ishikawa et al. |
| 2018/0373174 A1* | 12/2018 | Kojima .............. G03G 9/09725 |
| 2020/0310270 A1* | 10/2020 | Nakashima ........ G03G 15/0865 |
| 2021/0294227 A1* | 9/2021 | Sugawara ............. G03G 9/097 |
| 2023/0090120 A1* | 3/2023 | Yoshihara ............ G03G 9/0926 |
| | | 430/108.3 |

FOREIGN PATENT DOCUMENTS

| | | |
|---|---|---|
| JP | 2018018035 | 2/2018 |
| JP | 2018040952 | 3/2018 |
| JP | 2018097016 | 6/2018 |
| JP | 2018185507 | 11/2018 |
| JP | 2021092615 | 6/2021 |

* cited by examiner

ELECTROSTATIC CHARGE IMAGE DEVELOPING TONER SET, ELECTROSTATIC CHARGE IMAGE DEVELOPER SET, TONER CARTRIDGE SET, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-144897 filed Sep. 12, 2022.

BACKGROUND

(i) Technical Field

The present invention relates to an electrostatic charge image developing toner set, an electrostatic charge image developer set, a toner cartridge set, a process cartridge, an image forming apparatus, and an image forming method.

(ii) Related Art

In the related art, in electrophotographic image formation, using a white toner has been known for the purpose of forming a colored image on a color recording medium or a recording medium having transparency.

For example, JP2021-092615A proposes "an electrostatic charge image developing color toner set for forming superimposed images on a recording medium, that contains a color toner P positioned on an outermost layer of the image and a color toner Q in contact with the recording medium, in which both the color toner P and the color toner Q contain a polyester resin as a binder resin, the color toner P contains an ester wax, the color toner Q may contain an ester wax, and in a case where the color toner Q contains an ester wax, an ester wax content ratio in the color toner Q is lower than an ester wax content ratio in the color toner P".

JP2018-97016A proposes "a toner set comprising a white toner that includes white toner particles containing white color particles, and at least one selected from a color toner that includes color toner particles containing color particles and a transparent toner that includes transparent toner particles, in which an average circularity of the white toner particles is smaller than an average circularity of either the color toner particles or the transparent toner particles, and a small-diameter-side number-based particle size distribution index of the white toner particles is greater than a small-diameter-side number-based particle size distribution index of either the color toner particles or the transparent toner particles".

JP2018-040952A proposes "an electrostatic charge image developing toner comprising toner particles including a binder resin and a white pigment, in which a maximum frequent value in distribution of eccentricity B of the white pigment represented by Expression (1) is 0.75 or more and 0.95 or less, and a skewness in the distribution of the eccentricity B is −1.20 or more and 0.00 or less, $$\text{eccentricity } B = 2d/D \qquad \text{Expression (1):}$$

in Expression (1), D represents an equivalent circular diameter (μm) of a toner particle in observation of the cross section of the toner particle, and d represents a distance (μm)

from the centroid of the toner particle to the centroid of the white pigment in observation of the cross section of the toner particle".

JP2018-018035A discloses "an electrostatic charge image developing white toner comprising toner particles containing a binder resin, a release agent, and a white pigment, in which the content of the white pigment is 30% by mass or greater with respect to the entirety of the toner particles, and in a case where the volume-average particle size of the toner particles is defined as d, the release agent is present in an amount of 50% by mass or greater and 90% by mass or less with respect to the total mass of the release agent in the toner particles in a portion where the distance from the surface of the toner particles in the center-of-gravity direction is 0.075d or less, and the average maximum ferret diameter of the release agent domain in the toner particles is 0.05 d or greater and 0.15 d or less".

SUMMARY

Aspects of non-limiting embodiments of the present disclosure relate to an electrostatic charge image developing toner set containing a white toner that contains white toner particles including a binder resin, a white colorant, and a release agent, and a non-white color toner that contains color toner particles including a binder resin, a color colorant, and a release agent, in which, in observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, an image having a colored image on a white image and having excellent folding resistance and scratch resistance is obtained as compared with a case where a relationship of $W_C > W_W$ is satisfied.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following aspects.

According to an aspect of the present disclosure, there is provided an electrostatic charge image developing toner set containing: a white toner that contains white toner particles including a binder resin, a white colorant, and a release agent; and a non-white color toner that contains color toner particles including a binder resin, a color colorant, and a release agent, in which, in observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, a relationship of $W_C < W_W$ is satisfied.

BRIEF DESCRIPTION OF THE DRAWINGS

Exemplary embodiment(s) of the present invention will be described in detail based on the following figures, wherein.

DETAILED DESCRIPTION

Figure 1:
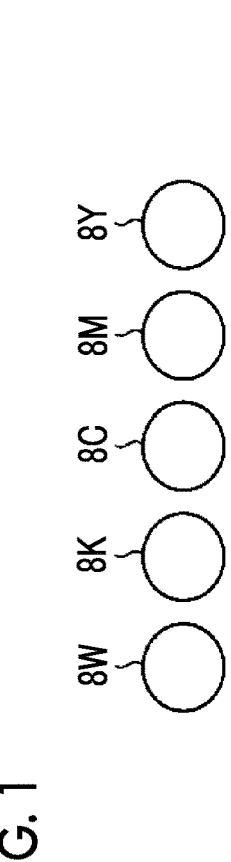
FIG. 1 is a view schematically showing the configuration of an example of an image forming apparatus according to the present exemplary embodiment.

Hereinafter, exemplary embodiments of the invention will be described. The following descriptions and examples merely illustrate the exemplary embodiments, and do not limit the scope of the invention.

In the present exemplary embodiments, a numerical range described using "to" represents a range including numerical values listed before and after "to" as the minimum value and the maximum value respectively.

Regarding the numerical ranges described in stages in the present exemplary embodiments, the upper limit or lower limit of a numerical range may be replaced with the upper limit or lower limit of another numerical range described in stages. Furthermore, in the present exemplary embodiments, the upper limit or lower limit of a numerical range may be replaced with values described in examples.

In the present exemplary embodiments, the term "step" includes not only an independent step but a step which is not clearly distinguished from other steps as long as the intended purpose of the step is achieved.

In the present exemplary embodiments, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiments, each component may include a plurality of corresponding substances. In a case where the amount of each component in a composition is mentioned in the present exemplary embodiments, and there are two or more kinds of substances corresponding to each component in the composition, unless otherwise specified, the amount of each component means the total amount of two or more kinds of the substances present in the composition.

In the present exemplary embodiments, the term "(meth) acryl" may denote any of "acryl" or "methacryl".

In the present exemplary embodiments, an "electrostatic charge image developing white toner" is also simply referred to as a "white toner", an "electrostatic charge image developing color toner" is also simply referred to as a "color toner", an "electrostatic charge white developer" is also simply referred to as a "white developer", and an "electrostatic charge color developer" is also simply referred to as a "color developer".

In addition, in the present exemplary embodiments, an "electrostatic charge image developing toner set" is also simply referred to as a "toner set", and an "electrostatic charge image developer set" is also simply referred to as a "developer set".

Electrostatic Charge Image Developing Toner Set

The toner set according to the present exemplary embodiment contains a white toner that contains white toner particles including a binder resin, a white colorant, and a release agent, and a non-white color toner that contains color toner particles including a binder resin, a color colorant, and a release agent. The color toner is a color toner that exhibits a color other than the white toner.

In the toner set according to the present exemplary embodiment, in observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, a relationship of $W_C < W_W$ is satisfied.

With the above-described configuration of the toner set according to the present exemplary embodiment, an image having a colored image on a white image and having excellent folding resistance and scratch resistance is obtained. The reason is presumed as follows.

In the related art, in a case of forming a colored image on a color recording medium or a recording medium having transparency, for the purpose of suppressing deterioration of color tone of the colored image, it has been known to form a white image by a white toner as a base layer.

On the other hand, in a case where the colored image is formed on the white image as a base layer, the image has a multi-layer structure as compared with a normal colored image, so that folding resistance of the image decreases as a toner application amount increases.

In a case where a fixing temperature is set to a high temperature, the folding resistance of the image is improved because the release agent easily bleeds out.

However, in a case where the fixing temperature is set to a high temperature, the color toner in the upper layer is excessively melted, and the release agent excessively bleeds out onto a surface of the colored image or onto the white image as a base layer. As a result, the release agent accumulates at an interface between the recording medium and the white image, adhesiveness between the recording medium and the image is lowered, and scratch resistance is lowered.

In the toner set according to the present exemplary embodiment, a relationship between the proportion $W_W$ of the area of the domain of the release agent present in the surface layer region from the surface of the white toner particles to a depth of 1 μm or less and the proportion $W_C$ of the area of the domain of the release agent present in the surface layer region from the surface of the color toner particles to the depth of 1 μm or less is $W_C < W_W$.

That is, the amount of the release agent present in the surface layer region of the white toner particles is larger than the amount of the release agent present in the surface layer region of the color toner particles. As a result, in the laminated structure of the white image and the colored image, the release agent in the white toner is more likely to melt and to bleed out earlier that the release agent in the color toner particles during fixing. Therefore, the release agent in the white toner particles permeates the inside of the medium, and excess bleeding of the release agent from the color toner particles is suppressed, so that the release agent is less likely to accumulate at the interface between the recording medium and the white image. As a result, the adhesiveness between the recording medium and the image is improved, and the decrease in scratch resistance is suppressed.

In addition, since the amount of the release agent bleeding out from the white toner particles and the color toner particles is secured, the decrease in breakability of the image is also suppressed.

From the above, with the toner set according to the present exemplary embodiment, it is presumed that an image having a colored image on a white image and having excellent folding resistance and scratch resistance is obtained.

Hereinafter, the details of the toner set according to the present exemplary embodiment will be described.

Relationship between White Toner and Color Toner

Relationship between Proportions of Areas of Domains of Release Agents Present in Surface Layer Regions of White Toner Particles and Color Toner Particles In observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, a relationship of $W_C < W_W$ is satisfied.

The relationship between the proportion $W_W$ of the area of the domain of the release agent present in the surface layer region of the white toner particles and the proportion $W_C$ of the area of the domain of the release agent present in the surface layer region of the color toner particles satisfies, for example, preferably $0.0\% < W_W - W_C < 60.0\%$ and more preferably $20\% < W_W - W_C < 40\%$.

In a case where the difference $W_W - W_C$ satisfies the above-described relationship, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

The proportion $W_W$ of the area of the domain of the release agent present in the surface layer region of the white toner particles is, for example, preferably 30.0% or more and 70.0% or less, more preferably 35% or more and 60% or less, and even more preferably 40% or more and 50% or less.

In a case where the proportion $W_W$ of the area of the domain of the release agent present in the surface layer region of the white toner particles is within the above-described range, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

Here, with regard to the proportion of the area of the domain of the release agent present in the surface layer region of the toner particles, for example, as an aggregation and coalescence method, a method in which the release agent particle dispersion is added in multiple stages so that the surface layer region of the toner particles is increased, a method of slowing down the heating time in multiple stages and lengthening the heat retention time, a method of lengthening the coalescence time, or the like is mentioned. In addition, as a kneading and pulverizing method, a method of, by adjusting the kneading conditions and pulverizing so that the release agent having a relatively large-diameter domain exists, preferentially existing the release agent having a large-diameter domain which is easily cracked on the surface layer, or the like is mentioned.

Domain Diameter of Release Agent in White Toner Particles and Color Toner Particles In the observation of the cross sections of the white toner particles and the color toner particles, a domain diameter of the release agent in the white toner particles and the color toner particles is, for example, preferably 200 nm or more and 2,000 nm or less, more preferably 400 nm or more and 1,500 nm or less, even more preferably 500 nm or more and 1,300 nm or less, and still more preferably 600 nm or more and 1,200 nm or less.

In a case where the domain diameter of the release agent in the white toner particles and the color toner particles is within the above-described range, the bleeding property of the release agent is increased, the adhesiveness between the recording medium and the image is further improved, and the amount of the release agent bleeding out from the white toner particles and the color toner particles is also further secured. As a result, the folding resistance and the scratch resistance of the image are further improved.

Method of Observing Cross Sections of White Toner Particles and Color Toner Particles A method of observing the cross sections of the white toner particles and the color toner particles for measuring the proportion of the area of the domain of the release agent present in the surface layer region of the toner particles and for measuring the domain diameter of the release agent is as follows.

Toner particles (or toner particles to which an external additive has adhered) are mixed with and embedded in an epoxy resin, and the epoxy resin is solidified. The obtained solidified substance is cut with an ultramicrotome device (UltracutUCT manufactured by Leica Microsystems), thereby producing a thin sample having a thickness of 80 nm or more and 130 nm or less. Next, the obtained thin sample is dyed with ruthenium tetroxide in a desiccator at 30° C. for 3 hours. By using an ultra-high resolution field emission scanning electron microscope (FE-SEM, S-4800 manufactured by Hitachi High-Tech Corporation.), an STEM observation image (acceleration voltage: 30 kV, magnification: 20,000 times) of the dyed thin sample in a transmission image mode is obtained.

The presence of the release agent in the toner particles is determined from the contrast and shape. In the SEM image, because the binder resin other than the release agent having more double bond portions compared to the amorphous resin, the release agent, and the like is dyed with ruthenium tetroxide, the crystalline resin dyed with ruthenium is differentiated into release agent portion and a resin portion other than the release agent.

That is, with the ruthenium dyeing, a domain in which the release agent has the brightest color, the crystalline resin (for example, a crystalline polyester resin) has the second brightest color, and the amorphous resin (for example, an amorphous polyester resin) has the darkest color is obtained. By contrast adjustment, the domain can be determined as that the release agent appears white, the amorphous resin appears black, and the crystalline resin appears light gray.

In addition, since the domain of the colorant is smaller than the domain of the release agent, the domains can be distinguished by the size. In addition, the domain of the colorant can be distinguished by the shade of the dyeing of the domain of the release agent.

Next, by image analysis of the region of the release agent dyed with ruthenium, the area of all domains of release agent present in a cross section of the toner particles and the area of the domain of the release agent present in the surface layer region from the surface of the toner particles to a depth of 1 μm or less are obtained. In a case where the release agent is present at a boundary at a depth of 1 μm from the surface of the toner particles, the area of a portion in the domain of the release agent present in the surface layer region of the toner particles is added to the area of the domain of the release agent present in the surface layer region of the toner particles.

Thereafter, the proportion of the area of the domain of the release agent present in the surface layer region from the surface of the toner particles to a depth of 1 μm or less with respect to the area of all domains of the release agent present in a cross section of the toner particles is obtained.

This operation is performed on 30 toner particles, and the average value of the obtained proportions of the areas of the domains of the release agent is calculated.

In addition, by image analysis of the region of the release agent dyed with ruthenium, the maximum length of the domain of the release agent is calculated and taken as the domain diameter.

This operation is performed on 30 toner particles, and the average value of the obtained domain diameters of the release agent is calculated.

Relationship Between Melting Temperatures of Release Agents in White Toner Particles and Color Toner Particles The relationship between the melting temperature $Tm_W$ of the release agent in the white toner particles and the melting temperature $Tm_C$ of the release agent in the color toner particles satisfies, for example, preferably $Tm_W < Tm_C$, more preferably $10°$ C.$\leq Tm_C - Tm_W < 30°$ C., and even more preferably $15°$ C.$\leq Tm_C - Tm_W < 25°$ C.

In a case where the relationship between the melting temperatures of the release agents in the white toner particles and the color toner particles satisfies the above-described relationship, the release agent bleeds out more easily at low temperature in the white toner than in the color toner, and the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

The melting temperature $Tm_W$ of the release agent in the white toner particles is, for example, preferably 70° C. or higher and 90° C. or lower, more preferably 70° C. or higher and 85° C. or lower, and even more preferably 70° C. or higher and 80° C. or lower.

In a case where the melting temperature $Tm_W$ of the release agent in the white toner particles is within the above-described range, the release agent bleeds out more easily at low temperature in the white toner than in the color toner. Therefore, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

The melting temperature of the release agent is determined from a DSC curve obtained by differential scanning calorimetry (DSC) by "peak melting temperature" described in the method for determining the melting temperature in JIS K 7121:1987, "Testing methods for transition temperatures of plastics".

Relationship Between Content Ratios of Binder Resin to Release Agent in White Toner Particles and Color Toner Particles The relationship between the content ratio $R_W$ of the binder resin to the release agent (binder resin/release agent) in the white toner particles and the content ratio $R_C$ of the binder resin to the release agent (binder resin/release agent) in the color toner particles satisfies, for example, preferably $R_W < R_C$, more preferably $1.0 < R_C - R_W < 6.0$, and even more preferably $3.0 < R_C - R_W < 5.0$.

In a case where the relationship between the content ratio $R_W$ of the binder resin to the release agent (binder resin/release agent) in the white toner particles and the content ratio $R_C$ of the binder resin to the release agent (binder resin/release agent) in the color toner particles is as described above, the total amount of the release agent bleeding out from the color toner as the upper layer and the white toner as the lower layer is maintained at an appropriate amount without impairing fixability. Therefore, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

The content ratio $R_W$ of the binder resin to the release agent (binder resin/release agent) in the white toner particles is, for example, preferably 6 or more and less than 10, more preferably 7 or more and less than 9, and even more preferably 8 or more and less than 9.

In a case where the content ratio $R_W$ of the binder resin to the release agent (binder resin/release agent) in the white toner particles is within the above-described range, the amount of the release agent bleeding out from the white toner can be suppressed without impairing fixability of the white toner as the lower layer. Therefore, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

In the color toner, the content of the release agent with respect to the total mass of the color toner particles is, for example, preferably 1% by mass or more and 20% by mass or less, and more preferably 5% by mass or more and 15% by mass or less.

On the other hand, in the white toner, the content of the release agent with respect to the total amount of the white toner particles is, for example, preferably 1% by mass or more and 20% by mass or less, more preferably 3% by mass or more and 18% by mass or less, and even more preferably 5% by mass or more and 15% by mass or less.

Relationship between Ratios of Content Ratio of Binder Resin to Release Agent (Binder Resin/Release Agent) to Volume-Average Particle Size of White Toner Particles in White Toner Particles and Color Toner Particles The relationship between the ratio $R_W/D_W$ of the content ratio $R_W$ of the binder resin to the release agent (binder resin/release agent) in the white toner particles to the volume-average particle size $D_W$ of the white toner particles and the ratio $R_W/D_C$ of the content ratio $R_C$ of the binder resin to the release agent (binder resin/release agent) in the color toner particles to the volume-average particle size $D_C$ of the color toner particles satisfies, for example, preferably $R_W/D_W<R_C/D_C$, more preferably $1.2<R_C/D_C-R_W/D_W<1.6$, and even more preferably $1.3<R_C/D_C-R_W/D_W<1.5$.

In a case where the relationship between the ratio $R_W/D_W$ of the content ratio $R_W$ of the binder resin to the release agent (binder resin/release agent) in the white toner particles to the volume-average particle size $D_W$ of the white toner particles and the ratio $R_W/D_C$ of the content ratio $R_C$ of the binder resin to the release agent (binder resin/release agent) in the color toner particles to the volume-average particle size $D_C$ of the color toner particles satisfies the above-described relationship, the amount of the release agent deposited to the toner surface area is appropriate. Therefore, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

Here, the volume-average particle size $D_W$ of the white toner particles is, for example, preferably 5.0 nm or more and 10.0 nm or less, and more preferably 6.0 nm or more and 9.0 nm or less.

On the other hand, the volume-average particle size $D_C$ of the color toner particles is, for example, preferably 3.0 nm or more and 8.0 nm or less, and more preferably 4.0 nm or more and 7.0 nm or less.

The volume-average particle size of the toner particles is measured using COULTER MULTISIZER II (manufactured by Beckman Coulter, Inc.) and using ISOTON-II (manufactured by Beckman Coulter, Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minu te with an ultrasonic disperser, and the particle size distribution of particles having a particle size in a range of 2 μm or more and 60 μm or less is measured using COULTER MULTI-SIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v.

Relationship of Loss Elastic Modulus and Storage Elastic Modulus of White Toner and Color Toner The relationship between the loss elastic modulus G" [W70] of the white toner at 70° C. and the loss elastic modulus G" [C70] of the color toner at 70° C. satisfies, for example, preferably $0.1 \leq G"[W70]/G"[C70] \leq 100$, and more preferably $1 \leq G"[W70]/G"[C70] \leq 50$.

The storage elastic modulus G'[W60] of the white toner at 60° C. is, for example, preferably $G'[W60] \geq 10^7$ Pa, and more preferably $10^9$ Pa$\geq G'[W60] \geq 10^7$ Pa.

The relationship between the storage elastic modulus G'[W60] of the white toner at 60° C. and the storage elastic modulus G'[C60] of the color toner at 60° C. satisfies, for example, preferably $50 \leq G'[W60]/G'[C60]$, and more preferably $80 \leq G'[W60]/G'[C60] \leq 10^4$.

In a case where the relationships of the loss elastic modulus and the storage elastic modulus of the white toner and the color toner are as described above, even the white toner layer present in the layer far from the fixing member, the softness of the toner during fixing is the same as the softness of the color toner layer, or the toner softness of the white toner layer is lower than the toner softness of the color toner layer during peeling. Accordingly, the permeation of excess release agents to the recording medium is difficult. Therefore, the above-described action of preventing the release agent from accumulating at the interface between the recording medium and the white image and the above-described action of ensuring the amount of the release agent bleeding out from the white toner particles and the color toner particles are likely to be exhibited. As a result, the folding resistance and the scratch resistance of the image are further improved.

The method for measuring the loss elastic modulus of the toner at 70° C. and the storage elastic modulus of the toner at 60° C. is as follows.

By applying pressure to the toner as a measurement target, a disk-shaped sample having a thickness of 2 mm and a diameter of 8 mm is produced and used as a measurement sample.

The obtained disk-shaped sample as a measurement sample is interposed between parallel plates having a diameter of 8 mm, and dynamic viscoelasticity is measured under the following conditions by raising the measurement temperature from 23° C. to 80° C. at 2° C./min at a strain of 0.1% to 100%. From each curve of the storage elastic modulus and the loss elastic modulus obtained by the measurement, the loss elastic modulus of the toner at 70° C. and the storage elastic modulus of the toner at 60° C. are obtained.

Measurement Conditions

Measurement device: rheometer ARES-G2 (manufactured by TA Instruments)

Gap: adjusted to 3 mm

Frequency: 1 Hz

Configuration of White Toner and Color Toner

Hereinafter, constituent components of the toner (white toner and color toner) contained in the toner set according to the present exemplary embodiment will be described.

The toner according to the present exemplary embodiment contains toner particles, and may further contain an external additive.

Here, the color toner, color toner particles, color colorant, and colored image refer to the toner, toner particles, colorant, and image having a color other than white. Examples of the color toner include color toners such as yellow (Y), magenta (M), and cyan (C), and black (K) toner.

As the color toner, toners of a plurality of colors may be used in combination. For example, toners of four colors of yellow toner, magenta toner, cyan toner, and black toner may be used in combination to form a toner set together with the white toner. In this case, for example, it is preferable that at least one of the color toners satisfies the above-described conditions, and it is preferable that all color toner used in combination satisfies the above-described conditions.

Toner Particles

The toner particles contain a binder resin, a colorant, and a release agent. The toner particles may contain other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of the resins with the vinyl-based resins, or graft polymers obtained by polymerizing a vinyl-based monomer together with the above resins.

One kind of each of the binder resins may be used alone, or two or more kinds of the binder resins may be used in combination.

As the binder resin, for example, a styrene acrylic resin or a polyester resin is preferable, and a polyester resin is particularly preferable.

(1) Styrene Acrylic Resin

For example, a preferred styrene acrylic resin as the binder resin is a copolymer obtained by copolymerizing at least a styrene-based monomer (a monomer having a styrene skeleton) and a (meth)acrylic monomer (a monomer containing a (meth)acryloyl group and, for example, preferably a monomer containing a (meth)acryloyloxy group). The styrene acrylic resin includes, for example, a copolymer of a monomer of styrenes and a monomer of (meth)acrylic acid esters described above. The acrylic resin portion in the styrene acrylic resin is any one of an acrylic monomer or a methacrylic monomer, or a partial structure obtained by polymerizing the monomers. In addition, "(meth)acrylic" is an expression including both of "acrylic" and "methacrylic".

Specific examples of the styrene-based monomer include styrene, alkyl-substituted styrene (such as α-methylstyrene, 2-methylstyrene, 3-methylstyrene, 4-methylstyrene, 2-ethylstyrene, 3-ethylstyrene, and 4-ethylstyrene), halogen-substituted styrene (such as 2-chlorostyrene, 3-chlorostyrene, and 4-chlorostyrene), and vinylnaphthalene. The styrene-based monomer may be used alone or in combination of two or more kinds thereof.

Among these, from the viewpoint of reaction, ease of control of reaction, and availability, as the styrene-based monomer, for example, styrene is preferable.

Specific examples of the (meth)acrylic monomer include (meth)acrylic acid and (meth)acrylic acid ester. Examples of the (meth)acrylic acid ester include (meth)acrylic acid alkyl ester (such as methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth) acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth) acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, and t-butylcyclohexyl (meth)acrylate), (meth)acrylic acid aryl ester (such as phenyl (meth)acrylate, biphenyl (meth)acrylate, diphenylethyl (meth)acrylate, t-butylphenyl (meth)acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acrylic monomer may be used alone or in combination of two or more kinds thereof.

Among the (meth)acrylic monomers, from the viewpoint of improving the fixability of the toner, for example, (meth) acrylic acid ester containing an alkyl group having 2 or more and 14 or less carbon atoms (for example, preferably 2 or more and 10 or less carbon atoms and more preferably 3 or more and 8 or less carbon atoms) is preferable from among the (meth)acrylic esters. Among these, for example, n-butyl (meth)acrylate is preferable, and n-butyl acrylate is particularly preferable.

The copolymerization ratio of the styrene-based monomer to the (meth)acrylic monomer (on a mass basis, styrene-based monomer/(meth)acrylic monomer) is not particularly limited, but is preferably 85/15 to 60/40.

The styrene acrylic resin has, for example, preferably a crosslinked structure. As the styrene acrylic resin having a crosslinked structure, for example, a resin obtained by copolymerizing at least a styrene-based monomer, a (meth) acrylic acid-based monomer, and a crosslinkable monomer is preferable.

Examples of the crosslinkable monomer include bifunctional or higher functional crosslinking agents.

Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, and glycidyl (meth)acrylate), polyester-type di(meth)acrylate, and 2-([1'-methylpropylideneamino]carboxyamino)ethyl methacrylate.

Examples of the trifunctional or higher crosslinking agent include a tri(meth)acrylate compound (such as pentaerythritol tri(meth)acrylate, trimethylolethanetri(meth)acrylate, and trimethylolpropane tri(meth)acrylate), a tetra(meth) acrylate compound (such as pentaerythritol tetra(meth)acrylate and oligoester (meth)acrylate), 2,2-bis(4-methacryloxy polyethoxyphenyl)propane, diallyl phthalate, triallyl cyanurate, triallyl isocyanurate, triallyl trimellitate, and diallyl chlorendate.

Among these, as the crosslinkable monomer, from the viewpoint of improving the fixability of the toner, for example, a bifunctional or higher functional (meth)acrylate compound is preferable, a bifunctional (meth)acrylate compound is more preferable, a bifunctional (meth)acrylate compound containing an alkylene group having 6 to 20 carbon atoms is even more preferable, and a bifunctional (meth)acrylate compound containing a linear alkylene group having 6 to 20 carbon atoms is particularly preferable.

The copolymerization ratio of the crosslinkable monomer to all the monomers (on a mass basis, crosslinkable monomer/all monomers) is not particularly limited, but is preferably 2/1,000 to 20/1,000.

From the viewpoint of improving the fixability of the toner, the glass transition temperature (Tg) of the styrene acrylic resin is, for example, preferably 40° C. or higher and 75° C. or lower, and more preferably 50° C. or higher and 65° C. or lower.

Here, the glass transition temperature of the resin is determined from a DSC curve obtained by the differential scanning calorimetry (DSC). More specifically, the glass transition temperature of the resin is determined by "extrapolated glass transition onset temperature" described in the method for determining a glass transition temperature in JIS K 7121: 1987, "Testing methods for transition temperatures of plastics".

From the viewpoint of storage stability of the toner, the weight-average molecular weight of the styrene acrylic resin is, for example, preferably 5,000 or more and 200,000 or less, more preferably 10,000 or more and 100,000 or less, and even more preferably 20,000 or more and 80,000 or less.

Here, the weight-average molecular weight and the number-average molecular weight of the resin are measured by gel permeation chromatography (GPC). By GPC, the molecular weight is measured using GPC·HLC-8120GPC manufactured by Tosoh Corporation as a measurement device, TSKgel Super HM-M (15 cm) manufactured by Tosoh Corporation as a column, and THE as a solvent. The weight-average molecular weight and the number-average molecular weight are calculated using a molecular weight calibration curve plotted using a monodisperse polystyrene standard sample from the measurement results.

A method of producing the styrene acrylic resin is not particularly limited, and various polymerization methods (for example, solution polymerization, precipitation polymerization, suspension polymerization, bulk polymerization, and emulsion polymerization) are applied. In addition, a known operation (for example, a batch type, semi-continuous type, or continuous type operation) is applied to the polymerization reaction.

(2) Polyester Resin

Examples of the polyester resin include a polycondensate of a polyvalent carboxylic acid and a polyhydric alcohol.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of the acids, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of the acids, lower alkyl esters (for example, having 1 or more and 5 or less carbon atoms) of the acids, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably 50° C. or higher and 80° C. or lower, and more preferably 50° C. or higher and 65° C. or lower.

The weight-average molecular weight (Mw) of the polyester resin is, for example, preferably 5,000 or more and 1,000,000 or less, and more preferably 7,000 or more and 500,000 or less. The number-average molecular weight (Mn) of the polyester resin is, for example, preferably 2,000 or more and 100,000 or less. The molecular weight distribution Mw/Mn of the polyester resin is, for example, preferably 1.5 or more and 100 or less, and more preferably 2 or more and 60 or less.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed with the main component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Colorant

As the colorant, in the case of the white toner particles, a white colorant is adopted, and in the case of the color toner particles, a color colorant other than the white colorant is adopted.

However, in the white toner particles, in a case where the white colorant is contained in an amount of 70% by mass or more with respect to the toner particles, the toner is considered to be the white toner even in a case where the toner contains the color colorant.

White Colorant

Examples of the white colorant include inorganic pigments and organic pigments.

Specific examples of the white colorant include, as the inorganic pigments, heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, calcined kaolin, delaminated kaolin, aluminosilicate, sericite, bentonite, smectite, and the like, and as the organic pigments, polystyrene resin particles, urea formalin resin particles, and the like.

Among the white colorants, from the viewpoint of forming a white image that has higher concealability and is more excellent in the color tone of the colored image, for example, at least one selected from the group consisting of titanium oxide, silicon oxide, aluminum oxide, zinc oxide, and zirconium oxide is preferable.

In particular, as the white colorant, from the viewpoint of excellent concealability, for example, titanium oxide is preferable. The crystal structure of the titanium oxide may be any of anatase type, rutile type, or brookite type.

As the white colorant, a white colorant having undergone a surface treatment as necessary may be used, or a dispersant may be used in combination with the colorant.

From the viewpoint of excellent concealability, the volume-average particle size of the white colorant is, for example, preferably 150 nm or more and 900 nm or less, more preferably 180 nm or more and 800 nm or less, and even more preferably 200 nm or more and 700 nm or less.

The volume-average particle size of the white colorant is calculated by observing the white colorant with a scanning electron microscope (SEM) apparatus (manufactured by Hitachi, Ltd.: S-4100) to capture an image, and taking the image into an image analyzer (LUZEXIII, manufactured by Nireco Co., Ltd.) to analyze the image. Specifically, an area of each particle is measured, and the equivalent circular diameter is calculated from the area value. The diameter (D50) taking up 50% in a cumulative frequency of the obtained equivalent circular diameter on a volume basis is adopted as the volume-average particle size of the white colorant. The magnification of the electron microscope is adjusted such that about 10 or more and 50 or less white colorants are projected in one field of view. The equivalent circular diameter of the primary particles is determined by combining observation results obtained in a plurality of fields of view.

One kind of white colorant may be used alone, or two or more kinds of colorants may be used in combination.

The content of the white colorant with respect to the total mass of the white toner particles is, for example, preferably 15% by mass or more and 45% by mass or less, and more preferably 20% by mass or more and 40% by mass or less.

Color Colorant

Examples of the color colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of color colorant may be used alone, or two or more kinds of colorants may be used in combination.

The content of the color colorant with respect to the total mass of the color toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral petroleum-based wax such as montan wax; ester-based wax such as fatty acid esters and montanic acid esters; and the like. The release agent is not limited to the agents.

Other Additives

Examples of other additives include known additives such as a magnetic material, a charge control agent, and inorganic powder. The additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The average circularity of the toner particles is, for example, preferably 0.94 or more and 1.00 or less, and more preferably 0.95 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Thereafter, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, and an aluminum-based coupling agent. One kind of each of the agents may be used alone, or two or more kinds of the agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of external additives externally added with respect to the toner particles is, for example, preferably 0.01% by mass or more and 5% by mass or less, and more preferably 0.01% by mass or more and 2.0% by mass or less.

Manufacturing Method of Toner

Next, a manufacturing method of the toner (white toner and color toner) according to the present exemplary embodiment will be described.

The toner according to the present exemplary embodiment is obtained by manufacturing toner particles and then externally adding external additives to the toner particles.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to the manufacturing methods, and a well-known manufacturing method is adopted.

Among these, an example of the aggregation and coalescence method will be described below. The example of the aggregation and coalescence method described below is an example of a manufacturing method in which a large number of domains of the release agent are present in the surface layer region of the toner particles. In the example of the aggregation and coalescence method described below, in a case where a large number of domains of the release agent are present in an inner region of the toner particles, the amount of the release agent dispersion may be increased in a first aggregated particle-forming step.

Specifically, in a case where the toner particles are manufactured by the aggregation and coalescence method, for example, the toner particles are preferably manufactured through:

a step of preparing each dispersion (dispersion preparing step);

a step of mixing a first resin particle dispersion in which first resin particles as the binder resin are dispersed, a colorant dispersion in which colorants (dyes, and as necessary pigments) are dispersed, and a release agent particle dispersion in which particles of the release agent (hereinafter, also referred to as "release agent particles") are dispersed to aggregate each particle and colorant in the obtained dispersions, thereby forming first aggregated particles (first aggregated particle-forming step);

a step of, after obtaining the first aggregated particle dispersion in the first aggregated particles are dispersed, adding second resin particles as the binder resin and a release agent particle dispersion to the first aggregated particle dispersion to further aggregate the second resin particles and the release agent particles on a surface of the first aggregated particles, thereby forming second aggregated particles (second aggregated particle-forming step);

a step of, after obtaining the second aggregated particle dispersion in the second aggregated particles are dispersed, adding third resin particles as the binder resin to the second aggregated particle dispersion to further aggregate the third resin particles on a surface of the second aggregated particles, thereby forming third aggregated particles (third aggregated particle-forming step); and a step of coalescing the third aggregated particles by heating the third aggregated particle dispersion in which the third aggregated particles are dispersed, thereby forming toner particles (coalescence step).

Each Dispersion Preparing Step

First, each dispersion to be used in the aggregation and coalescence method is prepared. Specifically, the first resin particle dispersion in which the first resin particles as the binder resin are dispersed, the colorant dispersion in which the colorants are dispersed, the second resin particle dispersion in which the second resin particles as the binder resin are dispersed, the release agent particle dispersion in which the release agent particles are dispersed, and the third resin particle dispersion in which the third resin particles as the binder resin are dispersed are prepared.

In each dispersion preparing step, the first resin particles, the second resin particles, and the third resin particles will be referred to and described as "resin particles".

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of the media may be used alone, or two or more kinds of the media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 m or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant dispersion and a release agent particle dispersion are prepared in the same manner as in the resin particle dispersion. That is, the volume-average particle size of particles, the dispersion medium, the dispersion method, and the particle content in the resin particle dispersion are also applied to the colorant to be dispersed in the colorant dispersion and the release agent particles to be dispersed in the release agent particle dispersion.

First Aggregated Particle-Forming Step

Next, the first resin particle dispersion is mixed with the colorant dispersion and the release agent particle dispersion.

In the mixed dispersion, the first resin particles, the colorant, and the release agent particles are hetero-aggregated to form the first aggregated particles including the first resin particles, the colorant, and the release agent particles.

Specifically, for example, an aggregating agent is added to the dispersion in which the first resin particle dispersion and the colorant dispersion are mixed, the pH of the mixed dispersion is adjusted such that the dispersion is acidic (for example, pH of 2 or higher and 5 or lower), a dispersion stabilizer is added thereto as necessary, and the temperature is adjusted to a temperature range of 20° C. or higher and 50° C. or lower. Thereafter, the release agent particle dispersion is added thereto, and the particles dispersed in the mixed dispersion are aggregated to form the first aggregated particles.

In the first aggregated particle-forming step, for example, in a state where the mixed dispersion is stirred with a rotary shearing homogenizer, the aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added with respect to 100 parts by mass of the first resin particles is, for example, preferably 0.01 parts by mass or more and 5.0 parts by mass or less, and more preferably 0.1 parts by mass or more and less than 3.0 parts by mass.

Second Aggregated Particle-Forming Step

Next, after obtaining the first aggregated particle dispersion in which the first aggregated particles are dispersed, a mixed dispersion in which the second resin particles and the release agent particles are dispersed is added to the first aggregated particle dispersion.

The second resin particles may be of the same type as the first resin particles, or may be of different types.

The second resin particles and the release agent particles are aggregated on the surface of the first aggregated particles in the first aggregated particles, the second resin particles, and the release agent particle dispersion. Specifically, for example, in the first aggregated particle-forming step, in a case where the first aggregated particles reach a target particle size, a mixed dispersion in which the second resin particles and the release agent particles are dispersed is added to the first aggregated particle dispersion, and the dispersion is aggregated in a temperature range of 45° C. or higher and 50° C. or lower.

As a result, the second aggregated particles such that the second resin particles and the release agent particles adhere to the surface of the first aggregated particles are obtained.

Third Aggregated Particle-Forming Step

After obtaining the second aggregated particle dispersion in which the second aggregated particles are dispersed, the third resin particles as the binder resin are added to the second aggregated particle dispersion.

The third resin particles may be of the same type as the first resin particles and the second resin particles, or may be of different types.

In the dispersion in which the second aggregated particles and the third resin particles are dispersed, the third resin particles are aggregated on the surface of the second aggregated particles. Specifically, for example, in the second aggregated particle-forming step, in a case where the second aggregated particles reach a target particle size, the third resin particles are added to the second aggregated particle dispersion, and the dispersion is heated at a temperature equal to or lower than the glass transition temperature of the third resin particles.

By setting the pH of the dispersion in a range of, for example, about 6.5 or more and 8.5 or less, the progress of aggregation is stopped.

Coalescence Step

The third aggregated particle dispersion in which the third aggregated particles are dispersed is then heated to, for example, a temperature equal to or higher than the glass transition temperature of the first, second, and third resin particles (for example, a temperature higher than the glass transition temperature of the first, second, and third resin particles by 10° C. to 30° C.) such that the third aggregated particles coalesce, thereby forming toner particles.

Toner particles are obtained through the above steps.

The toner particles may be manufactured through a step of obtaining an aggregated particle dispersion in which the third aggregated particles are dispersed, then mixing the third aggregated particle dispersion with a fourth resin particle dispersion in which fourth resin particles as the binder resin are dispersed to cause the fourth resin particles to be aggregated and adhere to the surface of the third aggregated particles and to form fourth aggregated particles, and a step of heating the fourth aggregated particle dispersion in which the fourth aggregated particles are dispersed to cause the fourth aggregated particles to coalesce and to form toner particles having a core/shell structure.

With the toner particles (toner) obtained by the operation, in a case where the cross section of the toner particles is observed, After the coalescence step, the toner particles formed in a solution undergo a known washing step, solid-liquid separation step, and drying step, thereby obtaining dry toner particles.

The washing step is not particularly limited. However, in view of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding an external additive to the obtained dry toner particles and mixing the external additive and the toner particles together, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer Set

The electrostatic charge image developer set according to the present exemplary embodiment includes a white electrostatic charge image developer containing the white toner in the toner set according to the present exemplary embodiment and a color electrostatic charge image developer containing the color toner in the electrostatic charge image developing toner set according to the present exemplary embodiment.

The electrostatic charge image developer set according to the present exemplary embodiment may be a one-component developer which contains each developer and only the toner in the toner set according to the present exemplary embodiment, or a two-component developer which is obtained by mixing the toner and a carrier together.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; and a resin impregnation-type carrier obtained by impregnating porous magnetic powder with a resin.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; and a kneader coater method of mixing the core material of the carrier with the solution for forming a coating layer in a kneader coater and removing solvents.

The mixing ratio (mass ratio) between the toner and the carrier, represented by toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes a first image forming unit that forms a white image by the white toner in the toner set according to the present exemplary embodiment, a second image forming unit that forms a colored image by the color toner in the toner set according to the present exemplary embodiment, a transfer unit that transfers the white image and the colored image onto a surface of a recording medium, and a fixing unit that fixes the white image and the colored image transferred onto the surface of the recording medium.

The image forming apparatus according to the present exemplary embodiment may have an aspect in which the image forming apparatus has, as the first or second image forming unit, image forming units each having an image holder, a charging unit that charges a surface of the image holder, an electrostatic charge image forming unit that forms an electrostatic charge image on the charged surface of the image holder, and a second developing unit that develops the electrostatic charge image formed on the surface of the image holder by an electrostatic charge image developer as a toner image.

In addition, the image forming apparatus according to the present exemplary embodiment may have an aspect in which the image forming apparatus has an image holder, a charging unit that charges a surface of the image holder, an electrostatic charge image forming unit that forms an electrostatic charge image on the charged surface of the image holder, and as the first or second image forming unit, a first or second developing unit that develops the electrostatic charge image formed on the surface of the image holder by an electrostatic charge image developer as a toner image.

With the image forming apparatus according to the present exemplary embodiment, an image forming method (the image forming method according to the present exemplary embodiment) including a first image forming step of forming a white image by the white toner in the electrostatic charge image developing toner set according to the present exemplary embodiment, a second image forming step of forming a colored image by the color toner in the electrostatic charge image developing toner set according to the present exemplary embodiment, a transfer step of transferring the white image and the colored image onto a recording medium, and a fixing step of fixing the white image and the colored image onto the recording medium is performed.

As the image forming apparatus according to the present exemplary embodiment, well-known image forming apparatuses are used, such as a direct transfer-type apparatus that transfers a toner image (white image and colored image in the present exemplary embodiment) formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be detachable from the image forming apparatus. As the process cartridge, for example, a process cartridge is suitably used which includes a developing unit that contains the electrostatic charge image developer set according to the present exemplary embodiment.

The image forming apparatus according to the present exemplary embodiment may be an image forming apparatus that contains the white toner in the toner set according to the present exemplary embodiment in the developing unit, and contains at least one color toner selected from yellow toner, magenta toner, cyan toner, or black toner in the developing unit.

The recording medium on which the image forming apparatus (image forming method) according to the present exemplary embodiment records an image is not particularly limited, and a known recording medium is applied. Examples of the recording medium include a resin film or sheet, and paper. Examples of applications of the resin film or sheet include packages, labels, packaging materials, advertising media, and OHP sheets.

Examples of the resin film or sheet include a film or sheet of polyolefin such as polyethylene and polypropylene; a film or sheet of polyester such as polyethylene terephthalate and polybutylene terephthalate; a film or sheet of polyamide such as nylon; and a film or sheet of polycarbonate, polystyrene, modified polystyrene, polyvinyl chloride, polyvinyl alcohol, polylactic acid, and the like. The films or sheets may be unstretched films or sheets, or uniaxially stretched or biaxially stretched films or sheets. The resin film or sheet may be in any form of a single layer or a multilayer. The resin film or sheet may be a film having a surface-coated layer that assists the fixation of toner, or a film or sheet that has been subjected to a corona treatment, an ozone treatment, a plasma treatment, a frame treatment, a glow discharge treatment, or the like.

Examples of laminating order of the recording medium, the colored image, and the white image (concealing layer) include the following (a), (b), and (c).

Laminating order (a): recording medium having transparency/colored image/white image (concealing layer) from a side closer to the viewer Laminating order (b): colored image/recording medium having transparency/white image (concealing layer) from a side closer to the viewer Laminating order (c): colored image/white image (concealing layer)/recording medium (regardless of whether or not there is transparency) from a side closer to the viewer An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment, which shows an intermediate transfer-type 5-unit tandem image forming apparatus.

The image forming apparatus shown in FIG. 1 includes first to fifth image forming units 10Y, 10M, 10C, 10K, and 10W (image forming means) adopting an electrophotographic method that output images of colors, yellow (Y), magenta (M), cyan (C), black (K), and white (W), based on color-separated image data. The image forming units (hereinafter, simply called "units" in some cases) 10Y, 10M, 10C, 10K, and 10W are arranged in a row in the horizontal direction in a state of being spaced apart by a predetermined distance. The units 10Y, 10M, 10C, 10K, and 10W may be process cartridges that are detachable from the image forming apparatus.

An intermediate transfer belt (an example of the intermediate transfer member) 20 passing through the units 10Y, 10M, 10C, 10K, and 10W extends under the units. The intermediate transfer belt 20 is looped around a driving roll 22, a support roll 23, and an opposing roll 24 that are in contact with the inner surface of the intermediate transfer belt 20, and runs toward a fifth unit 10W from a first unit 10Y. An intermediate transfer member cleaning device 21 facing the driving roll 22 is provided on the side of the image holding surface of the intermediate transfer belt 20.

Yellow, magenta, cyan, black, and white toners contained in containers of toner cartridges 8Y, 8M, 8C, 8K, and 8W are supplied to developing devices (developing units) 4Y, 4M, 4C, 4K, and 4W of units 10Y, 10M, 10C, 10K, and 10W, respectively.

The first to fifth units 10Y, 10M, 10C, 10K, and 10W have the same configuration and action and perform the same operation. Therefore, in the present specification, as a representative, the first unit 10Y will be described which is placed on the upstream side of the running direction of the intermediate transfer belt and forms a yellow image.

The first unit 10Y has a photoreceptor 1Y that acts as an image holder. Around the photoreceptor 1Y, a charging roll (an example of the charging unit) 2Y that charges the surface of the photoreceptor 1Y at a predetermined potential, an exposure device (an example of the electrostatic charge image forming unit) 3Y that exposes the charged surface to a laser beam based on color-separated image signals to form an electrostatic charge image, a developing device (an example of the developing unit) 4Y that develops the electrostatic charge image by supplying a toner to the electrostatic charge image, a primary transfer roll (an example of the primary transfer unit) 5Y that transfers the developed toner image onto the intermediate transfer belt 20, and a photoreceptor cleaning device (an example of the cleaning unit) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to primary transfer rolls 5Y, 5M, 5C, 5K, and 5W of each unit. Each bias power supply changes the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y The photoreceptor 1Y is formed of a photosensitive layer laminated on a conductive (for example, volume resistivity at 20° C.: $1 \times 10^{-6}$ Ω cm or less) substrate. The photosensitive layer has properties in that although this layer usually has a high resistance (resistance of a general resin), in a case where the photosensitive layer is irradiated with the laser beam, the specific resistance of the portion irradiated with the laser beam changes. From the exposure device 3Y, the laser beam is radiated to the surface of the charged photoreceptor 1Y according to the image data for yellow transmitted from the control unit not shown in the drawing. As a result, an electrostatic charge image of the yellow image pattern is formed on the surface of the photoreceptor 1Y The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam from the exposure device 3Y, but the charges in a portion not being irradiated with the laser beam remain.

The electrostatic charge image formed on the photoreceptor 1Y rotates to a predetermined development position as the photoreceptor 1Y runs. At the development position, the electrostatic charge image on the photoreceptor 1Y is developed as a toner image by the developing device 4Y and visualized.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

Meanwhile, the residual toner on the photoreceptor 1Y is removed by a photoreceptor cleaning device 6Y and collected.

The primary transfer bias applied to the primary transfer rolls 5M, 5C, 5K, and 5W following the second unit 10M is also controlled according to the first unit.

In this way, the intermediate transfer belt 20 to which the yellow toner image is transferred in the first unit 10Y is sequentially transported through the second to fifth units 10M, 10C, 10K, and 10W, and the toner images of each color are superposed and transferred in layers.

The intermediate transfer belt 20, to which the toner images of five colors are transferred in layers through the first to fifth units, reaches a secondary transfer portion configured with the intermediate transfer belt 20, the opposing roll 24 in contact with the inner surface of the intermediate transfer belt, and a secondary transfer roll 26 (an example of a secondary transfer unit) disposed on the image holding surface side of the intermediate transfer belt 20. On the other hand, through a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the opposing roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Thereafter, the recording paper P is transported into a pressure contact portion (nip portion) of a pair of fixing rolls in the fixing device 28 (an example of fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet, in addition to the recording paper P.

In order to further improve the smoothness of the image surface after fixing, for example, it is preferable that the surface of the recording paper P is also smooth. For example, coated paper prepared by coating the surface of plain paper with a resin or the like, art paper for printing, and the like are suitably used.

The recording paper P on which the colored image has been fixed is transported to an output portion, and a series of colored image forming operations is finished.

Process Cartridge and Toner Cartridge Set

The process cartridge according to the present exemplary embodiment will be described.

The process cartridge according to the present exemplary embodiment is a process cartridge which includes a first developing unit that contains the white electrostatic charge image developer in the electrostatic charge image developer set according to the present exemplary embodiment and a second developing unit that contains the color electrostatic charge image developer in the electrostatic charge image developer set according to the present exemplary embodiment and is detachable from an image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
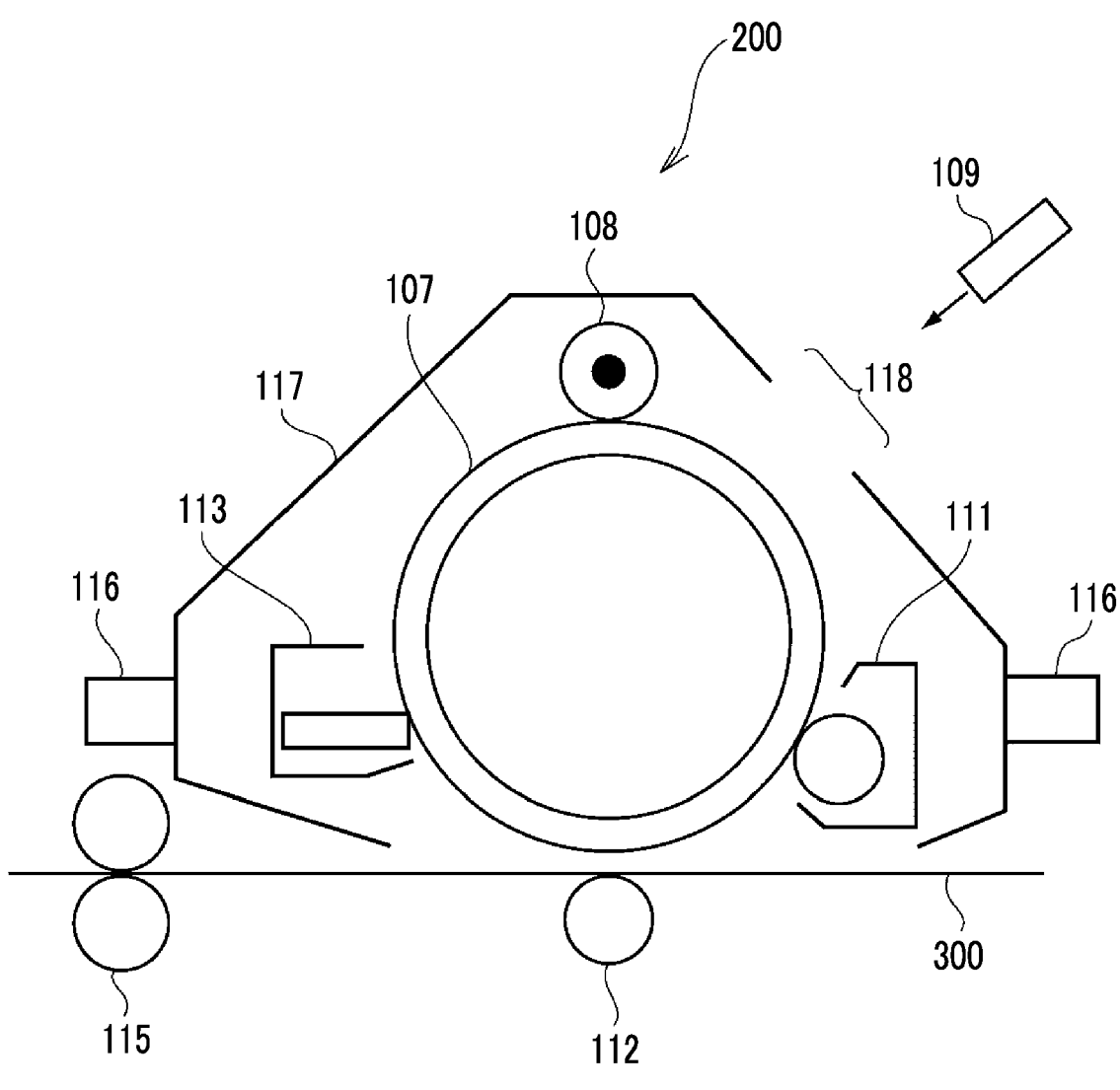
FIG. 2 is a view schematically showing an example of the configuration of the process cartridge according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit), which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge set according to the present exemplary embodiment will be described.

The toner cartridge set according to the present exemplary embodiment is a toner cartridge set including a white toner cartridge including a container that contains the white toner in the toner set according to the present exemplary embodiment and is detachable from the image forming apparatus, and a color toner cartridge including a container that contains the color toner in the toner set according to the present exemplary embodiment and is detachable from the image forming apparatus. The toner cartridge set includes a container that contains a replenishing toner to be supplied to the developing unit provided in the image forming apparatus.

The image forming apparatus shown in FIG. 2 is an image forming apparatus having a configuration that enables toner cartridges 8Y, 8M, 8C, 8K, and 8W to be detachable from the apparatus. The developing devices 4Y, 4M, 4C, 4K, and 4W are connected to toner cartridges corresponding to the respective developing devices (colors) by a toner supply pipe not shown in the drawing. In a case where the amount of the toner contained in the container of the toner cartridge is low, the toner cartridge is replaced.

EXAMPLES

Hereinafter, exemplary embodiments of the invention will be specifically described based on examples. However, the exemplary embodiments of the invention are not limited to the examples. In the following description, unless otherwise specified, "parts" and "%" are based on mass.

Preparation of Resin Particle Dispersion

Preparation of Styrene Acrylic Resin Particle Dispersion (1)

Styrene: 200 parts
n-Butyl acrylate: 50 parts
Acrylic acid: 1 part
O-Carboxyethyl acrylate: 3 parts
Propanediol diacrylate: 1 part
2-Hydroxyethyl acrylate: 0.5 parts
Dodecanethiol: 1 part A solution prepared by dissolving 4 parts of an anionic surfactant (DOWFAX manufactured by Dow Chemical Company) in 550 parts of deionized water is put in a flask, and a mixed solution obtained by mixing the above-described raw materials is added thereto and emulsified. While slowly stirring the emulsion for 10 minutes, 50 parts of deionized water in which 6 parts of ammonium persulfate is dissolved is added thereto. Next, nitrogen purging in the system is sufficiently performed, and the system is heated in an oil bath until the temperature in the system reaches 75° C. to be polymerized for 30 minutes.

Next,
Styrene: 110 parts
n-Butyl acrylate: 50 parts
β-Carboxyethyl acrylate: 5 parts
1,10-Decanediol diacrylate: 2.5 parts
Dodecanethiol: 2 parts A mixed solution is obtained by mixing the above-described raw materials and emulsified, and the emulsion is added to the above-described flask for 120 minutes, and emulsification polymerization is continued for 4 hours. As a result, a resin particle dispersion in which resin particles having a weight-average molecular weight of 32,000, a glass transition temperature of 53° C., and a volume-average particle size of 240 nm are dispersed is obtained. Deionized water is added to the above-described resin particle dispersion to adjust the solid content to 20%, thereby obtaining a styrene acrylic resin particle dispersion (1).

A styrene acrylic resin particle dispersion (2) is obtained in the same manner as in the styrene acrylic resin particle dispersion (1), except that 110 parts of the styrene at the beginning is changed to 80 parts.

A styrene acrylic resin particle dispersion (3) is obtained in the same manner as in the styrene acrylic resin particle dispersion (1), except that 110 parts of the styrene at the beginning is changed to 95 parts.

A styrene acrylic resin particle dispersion (4) is obtained in the same manner as in the styrene acrylic resin particle dispersion (1), except that 110 parts of the styrene at the beginning is changed to 115 parts.

A styrene acrylic resin particle dispersion (5) is obtained in the same manner as in the styrene acrylic resin particle dispersion (1), except that 110 parts of the styrene at the beginning is changed to 90 parts.

A styrene acrylic resin particle dispersion (6) is obtained in the same manner as in the styrene acrylic resin particle dispersion (1), except that 110 parts of the styrene at the beginning is changed to 98 parts.

A styrene acrylic resin particle dispersion (7) is obtained in the same manner as in the styrene acrylic resin particle dispersion (1), except that 110 parts of the styrene at the beginning is changed to 104 parts.

Preparation of White Colorant Particle Dispersion
Preparation of White Colorant Particle Dispersion (1)
Titanium oxide particles (manufactured by Titan Kogyo, Ltd., product number: KR-380): 100 parts
Anionic surfactant (manufactured by DKS Co. Ltd., NEOGEN R): 10 parts
Deionized water: 150 parts The above-described materials are mixed together in a 1000 ml Iboy wide-mouthed bottle (manufactured by AS ONE Corporation, polypropylene), 300 parts of 3 mm diameter zirconia beads is added thereto, and using a ball mill rotating table (manufactured by ASH), rotation treatment is performed at 300 rpm for 24 hours to remove the beads from the dispersion with a stainless sieve. Thereafter, deionized water is added thereto to obtain a white colorant particle dispersion (1) having a solid content of 40%. The volume-average particle size of the particles in the white colorant particle dispersion (1), measured by a laser diffraction type particle size distribution analyzer, is 500 nm.

Preparation of White Colorant Particle Dispersion (2)
Titanium oxide (manufactured by ISHIHARA SANGYO KAISHA, LTD., CR-60): 100 parts
Nonionic surfactant (NONIPOL 400: manufactured by Sanyo Chemical Industries, Ltd.): 10 parts
Deionized water: 400 parts The above-described components are mixed together, stirred for 30 minutes using a homogenizer (ULTRA-TURRAX T50: manufactured by IKA), and then subjected to a dispersion treatment for 1 hour using a high-pressure impact disperser ULTIMIZER (HJP30006: manufactured by SUGINO MACHINE LIMITED), thereby preparing a pigment dispersion having a concentration of solid content of 25% and obtaining a white colorant particle dispersion (2).

Preparation of Color Colorant Particle Dispersion
Preparation of Cyan Color Particle Dispersion (1)

C. I. Pigment Blue 15:3 (phthalocyanine-based pigment, manufactured by Dainichiseika Color & Chemicals Mfg.Co., Ltd., cyanine blue 4937): 50 parts
Ionic surfactant (manufactured by DKS Co. Ltd., NEOGEN RK): 5 parts
Deionized water: 192.9 parts The above-described components are mixed together and treated with ULTIMIZER (manufactured by SUGINO MACHINE LIMITED) at 240 MPa for 10 minutes, thereby preparing a cyan color particle dispersion (1) having a concentration of solid content of 20%.

Preparation of Release Agent Particle Dispersion
Preparation of Release Agent Particle Dispersion (1)
Paraffin wax ("AP-WAX 70" manufactured by ANDOH PARACHEMIE CO., LTD., melting temperature: 70° C.): 90 parts
Anionic surfactant (manufactured by DKS Co. Ltd., NEOGEN R): 3.6 parts
Deionized water: 360 parts The above-described materials are mixed together and heated at 100° C. to dissolve the wax, and using a pressure jet-type homogenizer (Gorlin homogenizer manufactured by Gorlin), a dispersion treatment is performed at a dispersion pressure of 5 MPa for 2 hours and then a dispersion treatment is performed at a dispersion pressure of 40 MPa for 3 hours, thereby obtaining a release agent particle dispersion (1) having a solid content of 20%. The volume-average particle size of the particles in the release agent particle dispersion (1) is 230 nm.

Preparation of Release Agent Particle Dispersion (2)
A release agent particle dispersion (2) is obtained in the same manner as in the release agent particle dispersion (1), except that the paraffin wax ("AP-WAX 70" manufactured by ANDOH PARACHEMIE CO., LTD., melting temperature: 70° C.) is changed to paraffin wax (FNP0090 manufactured by NIPPON SEIRO CO., LTD., melting temperature: 90° C.).

Preparation of Release Agent Particle Dispersion (3)
A release agent particle dispersion (3) is obtained in the same manner as in the release agent particle dispersion (1), except that the paraffin wax ("AP-WAX 70" manufactured by ANDOH PARACHEMIE CO., LTD., melting temperature: 70° C.) is changed to ester wax (WEP2 manufactured by NOF Corporation, melting temperature: 60° C.).

Preparation of Release Agent Particle Dispersion (4)
A release agent particle dispersion (4) is obtained in the same manner as in the release agent particle dispersion (1), except that the paraffin wax ("AP-WAX 70" manufactured by ANDOH PARACHEMIE CO., LTD., melting temperature: 70° C.) is changed to paraffin wax (HNP3 manufactured by NIPPON SEIRO CO., LTD., melting temperature: 65° C.).

Preparation of Release Agent Particle Dispersion (5)
A release agent particle dispersion (5) is obtained in the same manner as in the release agent particle dispersion (1), except that the paraffin wax ("AP-WAX 70" manufactured by ANDOH PARACHEMIE CO., LTD., melting temperature: 70° C.) is changed to paraffin wax (HNP80 manufactured by NIPPON SEIRO CO., LTD., melting temperature: 80° C.).

Preparation of Release Agent Particle Dispersion (6)
A release agent particle dispersion (6) is obtained in the same manner as in the release agent particle dispersion (1), except that the paraffin wax ("AP-WAX 70" manufactured by ANDOH PARACHEMIE CO., LTD., melting temperature: 70° C.) is changed to paraffin wax (HNP0190 manufactured by NIPPON SEIRO CO., LTD., melting temperature: 85° C.).

Preparation of Release Agent Particle Dispersion (7)

A release agent particle dispersion (7) is obtained in the same manner as in the release agent particle dispersion (1), except that the paraffin wax ("AP-WAX 70" manufactured by ANDOH PARACHEMIE CO., LTD., melting temperature: 70° C.) is changed to polyethylene wax (PW600 manufactured by Toyo-Petrolite, melting temperature: 92° C.).

Preparation of Release Agent Particle Dispersion (8)

A release agent particle dispersion (8) is obtained in the same manner as in the release agent particle dispersion (1), except that the paraffin wax ("AP-WAX 70" manufactured by ANDOH PARACHEMIE CO., LTD., melting temperature: 70° C.) is changed to Fischer-Tropsch wax (FT100 manufactured by NIPPON SEIRO CO., LTD., melting temperature: 95° C.).

Preparation of Release Agent Particle Dispersion (9)

A release agent particle dispersion (9) is obtained in the same manner as in the release agent particle dispersion (1), except that the paraffin wax ("AP-WAX 70" manufactured by ANDOH PARACHEMIE CO., LTD., melting temperature: 70° C.) is changed to polyethylene wax (PW655 manufactured by Toyo-Petrolite, melting temperature: 100° C.).

Preparation of Release Agent Particle Dispersion (10)

A release agent particle dispersion (10) is obtained in the same manner as in the release agent particle dispersion (1), except that the paraffin wax ("AP-WAX 70" manufactured by ANDOH PARACHEMIE CO., LTD., melting temperature: 70° C.) is changed to polyethylene wax (PW725 manufactured by Toyo-Petrolite, melting temperature: 105° C.).

Preparation of Release Agent Particle Dispersion (11)

270 parts of paraffin wax ("AP-WAX 70" manufactured by ANDOH PARACHEMIE CO., LTD., melting temperature: 70° C.), 15 parts of an anionic surfactant (NEOGEN RK manufactured by DKS Co. Ltd.), and 20 parts of deionized water are mixed together, and a release agent is dissolved in the mixture by using a pressure jet-type homogenizer (Gorlin homogenizer manufactured by Gorlin) at an internal solution temperature of 120° C. Next, the mixture is subjected to a dispersion treatment for 120 minutes at a dispersion pressure of 5 MPa and then for 360 minutes at 40 MPa, followed by cooling. Deionized water is added thereto such that the concentration of solid content is 25%, thereby obtaining a release agent particle dispersion (11). The volume-average particle size of the particles in the release agent particle dispersion is 220 nm.

Production of White Toner Particles

Production of White Toner Particles (1)

Deionized water: 400 parts

Styrene acrylic resin particle dispersion (1): 200 parts

White colorant particle dispersion (1): 40 parts

Release agent particle dispersion (1): 12 parts

Anionic surfactant (manufactured by Tayca Corporation, TaycaPower): 5 parts

The above-described components are put into a reaction vessel provided with a thermometer, a pH meter, and a stirrer, and the mixture is maintained at a temperature of 30° C. and a stirring rotation speed of 150 rpm for 30 minutes while the temperature is controlled with a mantle heater from the outside. While dispersing for 15 minutes at 5,000 rpm using a homogenizer (manufactured by IKA Japan: ULTRA-TURRAX T50), a PAC aqueous solution prepared by dissolving 2.1 parts of polyaluminum chloride (PAC, manufactured by Oji Paper Co., Ltd., 30% powder product) in 100 parts of deionized water is added thereto. Thereafter, the solution is heated to 50° C. while being stirred at a stirring rotation speed of 500 rpm, the particle size is measured with Coulter Multisizer II (aperture size: 50 μm, manufactured by Beckman Coulter, Inc.), and the volume-average particle size is set to 5.0 μm. Thereafter, 115 parts of the styrene acrylic resin particle dispersion (1) and 20 parts of the release agent particle dispersion (1) are additionally added thereto to adhere the resin particles and the release agent to a surface of the aggregated particles (shell structure). Subsequently, 20 parts of a 10% aqueous solution of NTA (nitrilotriacetic acid) metal salt (CHELEST 70: manufactured by CHELEST CORPORATION) is added thereto, and a 1N aqueous sodium hydroxide solution is added thereto to adjust the pH to 9.0. Thereafter, the heating rate is set to 0.05° C./min, the temperature is raised to 85° C. and maintained at 85° C. for 3 hours, and the obtained toner slurry is cooled to 70° C. and retained for 1 hour. Thereafter, the obtained toner is cooled to 25° C. The operation of redispersing the particles in deionized water and filtering the solution is repeatedly performed, the particles are washed until the electrical conductivity of the filtrate reaches 20 S/cm or less and vacuum-dried in an oven at 40° C. for 5 hours, thereby obtaining white toner particles (1). The volume-average particle size of the white toner particles (1) is 7.5 μm.

Next, 100 parts of the white toner particles (1) and 1.0 part of silica particles (RY50 manufactured by Nippon Aerosil Co., Ltd.) are mixed for 3 minutes at a circumferential speed of 30 m/sec using a Henschel mixer (manufactured by MITSUI MIIKE MACHINERY). Thereafter, the mixture is sieved using a vibration sieve having an opening size of 45 μm, thereby obtaining a white toner (1).

Production of White Toner (2)

A white toner (2) is obtained in the same manner as in the white toner (1), except that 12 parts of the release agent particle dispersion (1) prepared initially is changed to 6 parts, and 20 parts of the release agent particle dispersion (1) added later is changed to 26 parts.

Production of White Toner (3)

A white toner (3) is obtained in the same manner as in the white toner (1), except that 12 parts of the release agent particle dispersion (1) prepared initially is changed to 2 parts, and 20 parts of the release agent particle dispersion (1) added later is changed to 30 parts.

Production of White Toner (4)

A white toner (4) is obtained in the same manner as in the white toner (1), except that 12 parts of the release agent particle dispersion (1) prepared initially is changed to 16 parts, and 20 parts of the release agent particle dispersion (1) added later is changed to 16 parts.

Production of White Toner (5)

A white toner (5) is obtained in the same manner as in the white toner (1), except that the release agent particle dispersion (1) is changed to the release agent particle dispersion (2).

Production of White Toner (6)

A white toner (6) is obtained in the same manner as in the white toner (1), except that the release agent particle dispersion (1) is changed to the release agent particle dispersion (6).

Production of White Toner (7)

A white toner (7) is obtained in the same manner as in the white toner (1), except that the release agent particle dispersion (1) is changed to the release agent particle dispersion (5).

Production of White Toner (8)

A white toner (8) is obtained in the same manner as in the white toner (1), except that the release agent particle dispersion (1) is changed to the release agent particle dispersion (4).

Production of White Toner (9)

A white toner (9) is obtained in the same manner as in the white toner (1), except that the release agent particle dispersion (1) is changed to the release agent particle dispersion (7).

Production of White Toner (10)

A white toner (10) is obtained in the same manner as in the white toner (1), except that 20 parts of the release agent particle dispersion (1) is changed to 16 parts.

Production of White Toner (11)

A white toner (11) is obtained in the same manner as in the white toner (1), except that 20 parts of the release agent particle dispersion (1) is changed to 18 parts.

Production of White Toner (12)

A white toner (12) is obtained in the same manner as in the white toner (1), except that 20 parts of the release agent particle dispersion (1) is changed to 22 parts.

Production of White Toner (13)

A white toner (13) is obtained in the same manner as in the white toner (1), except that 20 parts of the release agent particle dispersion (1) is changed to 28 parts.

Production of White Toner (14)

A white toner (14) is obtained in the same manner as in the white toner (1), except that 20 parts of the release agent particle dispersion (1) is changed to 26 parts.

Production of White Toner (15)

A white toner (15) is obtained in the same manner as in the white toner (1), except that the volume-average particle size at the timing of adding the dispersion later is set to 3.0 μm.

Production of White Toner (16)

A white toner (16) is obtained in the same manner as in the white toner (1), except that 200 parts of the styrene acrylic resin particle dispersion (1) is changed to 200 parts of the styrene acrylic resin particle dispersion (2).

Production of White Toner (17)

A white toner (17) is obtained in the same manner as in the white toner (1), except that 200 parts of the styrene acrylic resin particle dispersion (1) is changed to 200 parts of the styrene acrylic resin particle dispersion (3).

Production of White Toner (18)

A white toner (18) is obtained in the same manner as in the white toner (1), except that 200 parts of the styrene acrylic resin particle dispersion (1) is changed to 200 parts of the styrene acrylic resin particle dispersion (4).

Production of White Toner (19)

A white toner (19) is obtained in the same manner as in the white toner (1), except that 200 parts of the styrene acrylic resin particle dispersion (1) is changed to 200 parts of the styrene acrylic resin particle dispersion (5).

Production of White Toner (20)

A white toner (20) is obtained in the same manner as in the white toner (1), except that 200 parts of the styrene acrylic resin particle dispersion (1) is changed to 200 parts of the styrene acrylic resin particle dispersion (6).

Production of White Toner (21)

A white toner (21) is obtained in the same manner as in the white toner (1), except that 200 parts of the styrene acrylic resin particle dispersion (1) is changed to 200 parts of the styrene acrylic resin particle dispersion (7).

Production of White Toner (22)

A white toner (22) is obtained in the same manner as in the white toner (1), except that 12 parts of the release agent particle dispersion (1) prepared initially is changed to 30 parts, and 20 parts of the release agent particle dispersion (1) added later is changed to 2 parts of the release agent particle dispersion (1).

Production of White Toner (PC1)

Amorphous polyester resin (A): 95 parts

Titanium oxide (manufactured by ISHIHARA SANGYO KAISHA, LTD., CR-60): 40 parts

Paraffin wax ("AP-WAX 70" manufactured by ANDOH PARACHEMIE CO., LTD., melting temperature: 70° C.): 10 parts The above-described raw materials are premixed in a Henschel mixer, and then kneaded with a twin-screw extrusion kneader having a screw configuration of a feeding portion-kneading portion-feeding portion-kneading portion-feeding portion under the following conditions. The rotation speed of the screw is set to 500 revolutions per minute (rpm), and the supply amount is set to 80 kg. In the above-described intermediate feeding portion, an aqueous medium of 1.5 parts of distilled water and 0.02 parts by weight of an anionic surfactant (DKS Co. Ltd., NEOGEN RK) is added with respect to 100 parts of a supply amount of the raw materials.

The kneaded material is slowly cooled at 10 degrees/sec or less by a rolling roll through which brine is passed and a cold water-cooled slab sandwiching-type cooling belt, coarsely pulverized by a pin mill, and then crushed by a hammer mill.

Thereafter, the crushed material is pulverized with a pulverizer (AFG400) having a built-in coarse powder pulverizing classifier, thereby obtaining white toner particles (PC1) having a predetermined particle size.

A white toner (PC1) is obtained in the same manner as in the white toner (1), except that the white toner particles (PC1) are used.

Production of White Toner Particles (PE1)

Preparation of Dispersion of Polyester Resin (A)

Ethyl acetate (40 parts) and 25 parts of 2-butanol are put in a vessel equipped with a temperature control unit and a nitrogen purge unit, thereby preparing a mixed solvent. Thereafter, 100 parts of the polyester resin (A) is slowly added to and dissolved in the solvent, a 10% aqueous ammonia solution (in an amount equivalent to 3 times the acid value of the resin in terms of molar ratio) is added thereto, and the mixed solution is stirred for 30 minutes. Next, the reaction vessel is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After dropwise addition ends, the emulsion is returned to 25° C., and the solvent is removed under reduced pressure, thereby obtaining a resin particle dispersion in which resin particles having a volume-average particle size of 160 nm are dispersed. Deionized water is added to the resin particle dispersion, and the solid content is adjusted to 25%, thereby obtaining a polyester resin particle dispersion (A).

Production of White Toner (PE1)

Polyester resin (A): 440 parts

White colorant particle dispersion (2): 160 parts

Release agent particle dispersion (11): 12 parts

The above-described raw materials are mixed together in a stainless steel flask and stirred for 30 minutes. Thereafter, 75 parts of a 10% aqueous aluminum sulfate solution is added dropwise thereto, followed by mixing and dispersion by a homogenizer. Thereafter, the mixture is heated to 45° C. under stirring, and retained at 45° C. for 30 minutes. Thereafter, 100 parts of the polyester dispersion is added thereto, the pH is adjusted using sodium hydroxide, and the temperature is slowly increased to 55° C. The particle size is measured with Coulter Multisizer II (aperture size: 50 μm, manufactured by Beckman Coulter, Inc.), and the volume-average particle size is set to 5.0 μm. Thereafter, 115 parts of the polyester resin (A) and 20 parts of the release agent particle dispersion (11) are additionally added thereto to adhere the resin particles and the release agent to a surface of the aggregated particles (shell structure). Thereafter, the pH is adjusted to 8 by using an aqueous sodium hydroxide solution, the temperature is raised to 90° C., and the mixture is stirred for about 3 hours to coalesce the aggregated particles.

Thereafter, the mixture is slowly cooled, and at a temperature of 40° C., the pH is adjusted to 9 by using an aqueous sodium hydroxide solution. Thereafter, the mixture is filtered and washed. The collected toner is subjected to a re-slurry process, washed with deionized water, adjusted to pH 5, and then stirred. Thereafter, the toner is repeatedly washed with deionized water, washed until the conductivity of the washing liquid reaches 50 S/cm or less, and then dried.

In this way, white toner particles (PE1) are obtained. A white toner (PE1) is obtained in the same manner as in the white toner (1), except that the white toner particles (PE1) are used.

Preparation of Color Toner

Production of Cyan Toner Particles (6)

Deionized water: 400 parts

Styrene acrylic resin particle dispersion (1): 200 parts

Cyan color particle dispersion (1): 25 parts

Release agent particle dispersion (2): 12 parts

Anionic surfactant (manufactured by Tayca Corporation, TaycaPower): 5 parts

The above-described components are put into a reaction vessel provided with a thermometer, a pH meter, and a stirrer, and the mixture is maintained at a temperature of 30° C. and a stirring rotation speed of 150 rpm for 30 minutes while the temperature is controlled with a mantle heater from the outside. While dispersing for 15 minutes at 5,000 rpm using a homogenizer (manufactured by IKA Japan: ULTRA-TURRAX T50), a PAC aqueous solution prepared by dissolving 2.1 parts of polyaluminum chloride (PAC, manufactured by Oji Paper Co., Ltd., 30% powder product) in 100 parts of deionized water is added thereto. Thereafter, the solution is heated to 50° C. while being stirred at a stirring rotation speed of 500 rpm, the particle size is measured with Coulter Multisizer II (aperture size: 50 μm, manufactured by Beckman Coulter, Inc.), and the volume-average particle size is set to 5.0 μm. Thereafter, 115 parts of the resin particle dispersion (1) and 10 parts of the release agent particle dispersion (2) are additionally added thereto to adhere the resin particles and the release agent particles to a surface of the aggregated particles (shell structure). Subsequently, 20 parts of a 10% aqueous solution of NTA (nitrilotriacetic acid) metal salt (CHELEST 70: manufactured by CHELEST CORPORATION) is added thereto, and a 1N aqueous sodium hydroxide solution is added thereto to adjust the pH to 9.0. Thereafter, the heating rate is set to 0.05° C./min, the temperature is raised to 91° C. and maintained at 91° C. for 3 hours, and the obtained toner slurry is cooled to 85° C. and retained for 1 hour. Thereafter, the obtained toner is cooled to 25° C. The operation of redispersing the particles in deionized water and filtering the solution is repeatedly performed, the particles are washed until the electrical conductivity of the filtrate reaches 20 S/cm or less and vacuum-dried in an oven at 40° C. for 5 hours, thereby obtaining cyan toner particles (1). The volume-average particle size of the cyan toner particles (1) is 6.1 μm.

Next, 100 parts of the cyan toner particles (1) and 1.0 part of silica particles (RY50 manufactured by Nippon Aerosil Co., Ltd.) are mixed for 3 minutes at a circumferential speed of 30 m/sec using a Henschel mixer (manufactured by MITSUI MIIKE MACHINERY). Thereafter, the mixture is sieved using a vibration sieve having an opening size of 45 μm, thereby obtaining a cyan toner (1).

Production of Cyan Toner (2)

A cyan toner (2) is obtained in the same manner as in the cyan toner (1), except that 12 parts of the release agent particle dispersion (2) prepared initially is changed to 8 parts, and 10 parts of the release agent particle dispersion (2) added later is changed to 14 parts.

Production of Cyan Toner (3)

A cyan toner (3) is obtained in the same manner as in the cyan toner (1), except that the release agent particle dispersion (2) is changed to the release agent particle dispersion (8).

Production of Cyan Toner (4)

A cyan toner (4) is obtained in the same manner as in the cyan toner (1), except that the release agent particle dispersion (2) is changed to the release agent particle dispersion (9).

Production of Cyan Toner (5)

A cyan toner (5) is obtained in the same manner as in the cyan toner (1), except that the release agent particle dispersion (2) is changed to the release agent particle dispersion (6).

Production of Cyan Toner (6)

A cyan toner (6) is obtained in the same manner as in the cyan toner (1), except that the release agent particle dispersion (2) is changed to the release agent particle dispersion (10).

Production of Cyan Toner (7)

A cyan toner (7) is obtained in the same manner as in the cyan toner (1), except that 10 parts of the release agent particle dispersion (2) added later is changed to 11 parts.

Production of Cyan Toner (8)

A cyan toner (8) is obtained in the same manner as in the cyan toner (1), except that 10 parts of the release agent particle dispersion (2) added later is changed to 7 parts.

Production of Cyan Toner (9)

A cyan toner (9) is obtained in the same manner as in the cyan toner (1), except that 10 parts of the release agent particle dispersion (2) added later is changed to 12 parts.

Production of Cyan Toner (10)

A cyan toner (10) is obtained in the same manner as in the cyan toner (1), except that 200 parts of the styrene acrylic resin particle dispersion (1) is changed to 200 parts of the styrene acrylic resin particle dispersion (6).

Production of Cyan Toner (11)

A cyan toner (11) is obtained in the same manner as in the cyan toner (1), except that 200 parts of the styrene acrylic resin particle dispersion (1) is changed to 200 parts of the styrene acrylic resin particle dispersion (7).

Production of Cyan Toner (12)

A cyan toner (12) is obtained in the same manner as in the cyan toner (1), except that 200 parts of the styrene acrylic resin particle dispersion (1) is changed to 200 parts of the styrene acrylic resin particle dispersion (3).

Production of Cyan Toner (13)

A cyan toner (13) is obtained in the same manner as in the cyan toner (1), except that 200 parts of the styrene acrylic resin particle dispersion (1) is changed to 200 parts of the styrene acrylic resin particle dispersion (5).

Production of Cyan Toner (14)

A cyan toner (14) is obtained in the same manner as in the cyan toner (1), except that 200 parts of the styrene acrylic resin particle dispersion (1) is changed to 200 parts of the styrene acrylic resin particle dispersion (4).

Examples 1 to 37 and Comparative Example 1

Toner sets of the white toner and the cyan toner shown in Table 1 are designated as the toner sets of each example.

8 parts of the toners of the toner sets of each example are mixed with 100 parts of a carrier obtained by a method shown below, thereby obtaining developer sets of each example.

Production of Carrier

Ferrite particles (volume-average particle size: 35 m): 100 parts

Toluene: 14 parts

Styrene-methyl methacrylate copolymer (copolymerization ratio: 15/85): 3 parts

Carbon black (Regal 330, Cabot Corporation): 0.2 parts

The above-described materials excluding the ferrite particles are dispersed with a sand mill, thereby preparing a dispersion. The dispersion is put in a vacuum deaerating kneader together with the ferrite particles, and dried under reduced pressure while being stirred, thereby obtaining a carrier.

Evaluation

The following evaluations are performed using the developer sets of each example.

First, the developer of the developer sets of each example is put into an image forming apparatus "Revoria Press PC1120 remodeling machine" (manufactured by FUJIFILM Business Innovation Corp.) adopting a two-component contact development method.

Next, using the image forming apparatus, 20 sheets of a 100% image density white image and a 100% image density cyan image on the white image with a width of 20 mm in the recording paper conveying direction are output to the recording paper (FUJIFILM Business Innovation Corp. recommended paper Fantas black, basis weight: 120 gsm, for folding resistance evaluation) and OZK-100 (PET film, for scratch resistance evaluation).

The following evaluations are performed on the 20th image output.

Folding Resistance

A fold is made inward in the center of the image, a portion where the fixed image is destroyed is wiped off with a tissue paper, and image defects are evaluated according to the following evaluation standard.

Scratch Resistance

After scratching the image using a scratch tester manufactured by LINAX co., ltd. (pressurizing 0.5 kg), image defects in the scratched portion are evaluated according to the following evaluation standard.

A: there is no image defect and there is no problem at all

B: some image defects are observed, which is not a problem

C: minor image defects are observed, which is not a problem

D: practically unsuitable due to the occurrence of image defects

Table 1 shows the following characteristics of the white toner and the color toner (cyan toner in the examples).

Proportion $W_W$ of an area of a domain of the release agent present in a surface layer region from a surface of the white toner particles to a depth of 1 μm or less with respect to an area of all domains of the release agent present in a cross section of the white toner particles Proportion $W_C$ of an area of a domain of the release agent present in a surface layer region from a surface of the color toner particles to a depth of 1 μm or less with respect to an area of all domains of the release agent present in a cross section of the color toner particles Melting temperature $Tm_W$ of the release agent in the white toner particles Melting temperature $Tm_C$ of the release agent in the color toner particles Content ratio $R_W$ of the binder resin to the release agent (binder resin/release agent) in the white toner particles Content ratio $R_C$ of the binder resin to the release agent (binder resin/release agent) in the color toner particles Volume-average particle size $D_W$ of the white toner particles Volume-average particle size $D_C$ of the color toner particles Loss elastic modulus G" [W70] of the white toner at 70° C.

Loss elastic modulus G" [C70] of the color toner at 70° C.

Storage elastic modulus G" [W60] of the white toner at 60° C.

Storage elastic modulus G" [C60] of the color toner at 60° C.

TABLE 1

| | | White toner | | | | | |
|---|---|---|---|---|---|---|---|
| | Type | Area proportion of domain of release agent $W_W$ % | Melting temperature of release agent $Tm_W$ ° C. | Content ratio (binder resin/release agent) $R_W$ — | Particle size $D_W$ nm | G"[W70] Pa | G'[W60] Pa |
| Example 1 | White (1) | 30 | 70 | 9.0 | 7.5 | 26287700 | 347388000 |
| Example 2 | White (2) | 70 | 70 | 9.0 | 7.5 | 26287700 | 347388000 |
| Example 3 | White (3) | 75 | 70 | 9.0 | 7.5 | 26287700 | 347388000 |
| Example 4 | White (4) | 25 | 70 | 9.0 | 7.5 | 26287700 | 347388000 |

TABLE 1-continued

| | Type | $W$ % | $Tm$ °C. | $R$ | $D$ nm | G" Pa | G' Pa |
|---|---|---|---|---|---|---|---|
| Example 5 | White (1) | 30 | 70 | 9.0 | 7.5 | 26287700 | 347388000 |
| Example 6 | White (2) | 70 | 70 | 9.0 | 7.5 | 26287700 | 347388000 |
| Example 7 | White (3) | 75 | 70 | 9.0 | 7.5 | 26287700 | 347388000 |
| Example 8 | White (5) | 30 | 90 | 9.0 | 7.5 | 26287700 | 347388000 |
| Example 9 | White (6) | 30 | 85 | 9.0 | 7.5 | 26287700 | 347388000 |
| Example 10 | White (7) | 30 | 80 | 9.0 | 7.5 | 26287700 | 347388000 |
| Example 11 | White (1) | 30 | 70 | 9.0 | 7.5 | 26287700 | 347388000 |
| Example 12 | White (1) | 30 | 70 | 9.0 | 7.5 | 26287700 | 347388000 |
| Example 13 | White (8) | 30 | 65 | 9.0 | 7.5 | 26287700 | 347388000 |
| Example 14 | White (1) | 30 | 70 | 9.0 | 7.5 | 26287700 | 347388000 |
| Example 15 | White (5) | 30 | 90 | 9.0 | 7.5 | 26287700 | 347388000 |
| Example 16 | White (9) | 30 | 92 | 9.0 | 7.5 | 26287700 | 347388000 |
| Example 17 | White (10) | 30 | 70 | 12 | 7.5 | 26287700 | 347388000 |
| Example 18 | White (10) | 30 | 70 | 12 | 7.5 | 26287700 | 347388000 |
| Example 19 | White (11) | 30 | 70 | 11 | 7.5 | 26287700 | 347388000 |
| Example 20 | White (1) | 30 | 70 | 9 | 7.5 | 26287700 | 347388000 |
| Example 21 | White (12) | 30 | 70 | 8.2 | 7.5 | 26287700 | 347388000 |
| Example 22 | White (13) | 30 | 70 | 5.7 | 7.5 | 26287700 | 347388000 |
| Example 23 | White (14) | 30 | 70 | 6 | 7.5 | 26287700 | 347388000 |
| Example 24 | White (1) | 30 | 70 | 9 | 7.5 | 26287700 | 347388000 |
| Example 25 | White (11) | 30 | 70 | 11 | 7.5 | 26287700 | 347388000 |
| Example 26 | White (15) | 30 | 70 | 12 | 4.7 | 26287700 | 347388000 |
| Example 27 | White (1) | 30 | 70 | 9.0 | 7.5 | 26287700 | 347388000 |
| Example 28 | White (16) | 30 | 70 | 9 | 7.5 | 14000 | 300000000 |
| Example 29 | White (17) | 30 | 70 | 9 | 7.5 | 170000 | 780000000 |
| Example 30 | White (18) | 30 | 70 | 9 | 7.5 | 54000000 | 760000000 |
| Example 31 | White (18) | 30 | 70 | 9 | 7.5 | 54000000 | 760000000 |
| Example 32 | White (17) | 30 | 70 | 9 | 7.5 | 170000 | 48000000 |
| Example 33 | White (19) | 30 | 70 | 9 | 7.5 | 145000 | 41000000 |
| Example 34 | White (20) | 30 | 70 | 9 | 7.5 | 580000 | 3500000 |
| Example 35 | White (21) | 30 | 70 | 9 | 7.5 | 6700000 | 11000000 |
| Example 36 | White (PE1) | 30 | 70 | 9 | 7.4 | 20200000 | 294100000 |
| Example 37 | White (PC1) | 30 | 70 | 9 | 8.2 | 24200000 | 324100000 |
| Comparative Example 1 | White (C22) | 7 | 70 | 9 | 7.5 | 26287700 | 347388000 |

| | | Cyan toner | | | | | |
|---|---|---|---|---|---|---|---|
| | Type | Area proportion of domain of release agent $W_C$ % | Melting temperature of release agent $Tm_C$ °C. | Content ratio (binder resin/release agent) $R_C$ — | Particle size $D_W$ nm | G"[C70] Pa | G'[C60] Pa |
| Example 1 | Cyan (1) | 10 | 90 | 12.6 | 4.7 | 550547 | 3863840 |
| Example 2 | Cyan (1) | 10 | 90 | 12.6 | 4.7 | 550547 | 3863840 |
| Example 3 | Cyan (1) | 10 | 90 | 12.6 | 4.7 | 550547 | 3863840 |
| Example 4 | Cyan (2) | 20 | 90 | 12.6 | 4.7 | 550547 | 3863840 |
| Example 5 | Cyan (2) | 20 | 90 | 12.6 | 4.7 | 550547 | 3863840 |
| Example 6 | Cyan (2) | 20 | 90 | 12.6 | 4.7 | 550547 | 3863840 |
| Example 7 | Cyan (2) | 20 | 90 | 12.6 | 4.7 | 550547 | 3863840 |
| Example 8 | Cyan (1) | 10 | 90 | 12.6 | 4.7 | 550547 | 3863840 |
| Example 9 | Cyan (1) | 10 | 90 | 12.6 | 4.7 | 550547 | 3863840 |
| Example 10 | Cyan (1) | 10 | 90 | 12.6 | 4.7 | 550547 | 3863840 |
| Example 11 | Cyan (3) | 10 | 95 | 12.6 | 4.7 | 550547 | 3863840 |
| Example 12 | Cyan (4) | 10 | 100 | 12.6 | 4.7 | 550547 | 3863840 |
| Example 13 | Cyan (5) | 10 | 85 | 12.6 | 4.7 | 550547 | 3863840 |
| Example 14 | Cyan (5) | 10 | 85 | 12.6 | 4.7 | 550547 | 3863840 |
| Example 15 | Cyan (6) | 10 | 105 | 12.6 | 4.7 | 550547 | 3863840 |
| Example 16 | Cyan (6) | 10 | 105 | 12.6 | 4.7 | 550547 | 3863840 |
| Example 17 | Cyan (7) | 10 | 90 | 12 | 4.7 | 550547 | 3863840 |
| Example 18 | Cyan (6) | 10 | 105 | 12.6 | 4.7 | 550547 | 3863840 |
| Example 19 | Cyan (7) | 10 | 90 | 12 | 4.7 | 550547 | 3863840 |
| Example 20 | Cyan (8) | 10 | 90 | 14.8 | 4.7 | 550547 | 3863840 |
| Example 21 | Cyan (8) | 10 | 90 | 14.8 | 4.7 | 550547 | 3863840 |
| Example 22 | Cyan (9) | 10 | 90 | 11.6 | 4.7 | 550547 | 3863840 |
| Example 23 | Cyan (9) | 10 | 90 | 11.6 | 4.7 | 550547 | 3863840 |
| Example 24 | Cyan (7) | 10 | 90 | 12 | 4.7 | 550547 | 3863840 |
| Example 25 | Cyan (1) | 10 | 90 | 12.6 | 4.7 | 550547 | 3863840 |
| Example 26 | Cyan (9) | 10 | 90 | 11.6 | 4.7 | 550547 | 3863840 |
| Example 27 | Cyan (9) | 10 | 90 | 11.6 | 4.7 | 550547 | 3863840 |
| Example 28 | Cyan (10) | 10 | 90 | 12.6 | 4.7 | 450000 | 5600000 |
| Example 29 | Cyan (11) | 10 | 90 | 12.6 | 4.7 | 1400000 | 11000000 |
| Example 30 | Cyan (1) | 10 | 90 | 12.6 | 4.7 | 550547 | 3863840 |
| Example 31 | Cyan (12) | 10 | 90 | 12.6 | 4.7 | 481200 | 1300000 |
| Example 32 | Cyan (13) | 10 | 90 | 12.6 | 4.7 | 881500 | 1000000 |
| Example 33 | Cyan (14) | 10 | 90 | 12.6 | 4.7 | 488150 | 713300 |
| Example 34 | Cyan (1) | 10 | 90 | 12.6 | 4.7 | 550547 | 3863840 |
| Example 35 | Cyan (1) | 10 | 90 | 12.6 | 4.7 | 550547 | 3863840 |

TABLE 1-continued

| | | | | | | | |
|---|---|---|---|---|---|---|---|
| Example 36 | Cyan (1) | 10 | 90 | 12.6 | 4.7 | 550547 | 3863840 |
| Example 37 | Cyan (1) | 10 | 90 | 12.6 | 4.7 | 550547 | 3863840 |
| Comparative Example 1 | Cyan (1) | 10 | 90 | 12.6 | 4.7 | 550547 | 3863840 |

| | $W_W - W_C$ | $Tm_C - Tm_W$ | $R_C - R_W$ | $R_W/D_W$ | $R_C/D_C$ | G"[W70]/ G"[C70] | G'[W60]/ G'[C60] | Folding resistance | Scratch resistance |
|---|---|---|---|---|---|---|---|---|---|
| Example 1 | 20 | 20 | 3.6 | 1.20 | 2.68 | 47.7 | 89.9 | A | A |
| Example 2 | 60 | 20 | 3.6 | 1.20 | 2.68 | 47.7 | 89.9 | A | A |
| Example 3 | 65 | 20 | 3.6 | 1.20 | 2.68 | 47.7 | 89.9 | A | B |
| Example 4 | 5 | 20 | 3.6 | 1.20 | 2.68 | 47.7 | 89.9 | A | A |
| Example 5 | 10 | 20 | 3.6 | 1.20 | 2.68 | 47.7 | 89.9 | A | A |
| Example 6 | 50 | 20 | 3.6 | 1.20 | 2.68 | 47.7 | 89.9 | A | B |
| Example 7 | 55 | 20 | 3.6 | 1.20 | 2.68 | 47.7 | 89.9 | A | C |
| Example 8 | 20 | 0 | 3.6 | 1.20 | 2.68 | 47.7 | 89.9 | C | A |
| Example 9 | 20 | 5 | 3.6 | 1.20 | 2.68 | 47.7 | 89.9 | B | A |
| Example 10 | 20 | 10 | 3.6 | 1.20 | 2.68 | 47.7 | 89.9 | A | A |
| Example 11 | 20 | 25 | 3.6 | 1.20 | 2.68 | 47.7 | 89.9 | A | A |
| Example 12 | 20 | 30 | 3.6 | 1.20 | 2.68 | 47.7 | 89.9 | A | B |
| Example 13 | 20 | 20 | 3.6 | 1.20 | 2.68 | 47.7 | 89.9 | A | B |
| Example 14 | 20 | 15 | 3.6 | 1.20 | 2.68 | 47.7 | 89.9 | A | A |
| Example 15 | 20 | 15 | 3.6 | 1.20 | 2.68 | 47.7 | 89.9 | B | A |
| Example 16 | 20 | 13 | 3.6 | 1.20 | 2.68 | 47.7 | 89.9 | C | A |
| Example 17 | 20 | 20 | 0 | 1.60 | 2.55 | 47.7 | 89.9 | C | A |
| Example 18 | 20 | 35 | 0.6 | 1.60 | 2.68 | 47.7 | 89.9 | B | A |
| Example 19 | 20 | 20 | 1 | 1.47 | 2.55 | 47.7 | 89.9 | A | A |
| Example 20 | 20 | 20 | 5.8 | 1.20 | 3.15 | 47.7 | 89.9 | A | A |
| Example 21 | 20 | 20 | 6.6 | 1.09 | 3.15 | 47.7 | 89.9 | A | B |
| Example 22 | 20 | 20 | 5.9 | 0.76 | 2.47 | 47.7 | 89.9 | A | C |
| Example 23 | 20 | 20 | 5.6 | 0.80 | 2.47 | 47.7 | 89.9 | A | B |
| Example 24 | 20 | 20 | 3 | 1.20 | 2.55 | 47.7 | 89.9 | A | A |
| Example 25 | 20 | 20 | 1.6 | 1.47 | 2.68 | 47.7 | 89.9 | B | A |
| Example 26 | 20 | 20 | −0.4 | 2.55 | 2.47 | 47.7 | 89.9 | B | A |
| Example 27 | 20 | 20 | 2.6 | 1.20 | 2.47 | 47.7 | 89.9 | A | A |
| Example 28 | 20 | 20 | 3.6 | 1.20 | 2.68 | 0.03 | 53.6 | B | C |
| Example 29 | 20 | 20 | 3.6 | 1.20 | 2.68 | 0.1 | 70.9 | B | B |
| Example 30 | 20 | 20 | 3.6 | 1.20 | 2.68 | 98.1 | 196.7 | B | A |
| Example 31 | 20 | 20 | 3.6 | 1.20 | 2.68 | 112.2 | 584.6 | C | A |
| Example 32 | 20 | 20 | 3.6 | 1.20 | 2.68 | 0.2 | 48.0 | C | B |
| Example 33 | 20 | 20 | 3.6 | 1.20 | 2.68 | 0.3 | 57.5 | B | B |
| Example 34 | 20 | 20 | 3.6 | 1.20 | 2.68 | 1.1 | 0.9 | B | C |
| Example 35 | 20 | 20 | 3.6 | 1.20 | 2.68 | 12.2 | 2.8 | B | B |
| Example 36 | 20 | 20 | 3.6 | 1.22 | 2.68 | 36.7 | 76.1 | A | A |
| Example 37 | 20 | 20 | 3.6 | 1.10 | 2.68 | 44.0 | 83.9 | A | A |
| Comparative Example 1 | −3 | 20 | 3.6 | 1.20 | 2.68 | 47.7 | 89.9 | D | D |

From the above results, in the present examples, it is found that an image having a colored image on a white image and having excellent folding resistance and scratch resistance is obtained.

The present exemplary embodiments include the following aspects.

(((1)))

An electrostatic charge image developing toner set comprising:

a white toner that contains white toner particles including a binder resin, a white colorant, and a release agent; and a non-white color toner that contains color toner particles including a binder resin, a color colorant, and a release agent, wherein, in observation of cross sections of the white toner particles and the color toner particles, in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 m or less with respect to an area of all domains of the release agent present in a cross section of the color toner particles is represented by $W_C$, a relationship of $W_C < W_W$ is satisfied.

(((2)))

The electrostatic charge image developing toner set according to (((1))), wherein, in the proportion $W_W$ of the area of the domain of the release agent present in the surface layer region of the white toner particles, and in the proportion $W_C$ of the area of the domain of the release agent present in the surface layer region of the color toner particles, a relationship of $0.0\% < W_W - W_C < 60.0\%$ is satisfied.

(((3)))

The electrostatic charge image developing toner set according to (((2))), wherein the proportion $W_W$ of the area of the domain of the release agent present in the surface layer region of the white toner particles is 30.0% or more and 70.0% or less.

(((4)))

The electrostatic charge image developing toner set according to any one of (((1))) to (((3))), wherein, in a case where a melting temperature of the release agent in the white toner particles is represented by $Tm_W$, and a melting temperature of the release agent in the color toner particles is represented by $Tm_C$, a relationship of $Tm_W < Tm_C$ is satisfied.

(((5)))

The electrostatic charge image developing toner set according to (((4))), wherein, in the melting temperature $Tm_W$ of the release agent in the white toner particles, and in the melting temperature $Tm_C$ of the release agent in the color toner particles, a relationship of $10°\,C. \le Tm_C - Tm_W < 30°\,C.$ is satisfied.

(((6)))

The electrostatic charge image developing toner set according to (((5))), wherein the melting temperature $Tm_W$ of the release agent in the white toner particles is 70° C. or higher and 90° C. or lower.

(((7)))

The electrostatic charge image developing toner set according to any one of (((1))) to (((6))), wherein, in a case where a content ratio of the binder resin to the release agent (binder resin/release agent) in the white toner particles is represented by $R_W$, and a content ratio of the binder resin to the release agent (binder resin/release agent) in the color toner particles is represented by $R_C$, a relationship of $R_W < R_C$ is satisfied.

(((8)))

The electrostatic charge image developing toner set according to (((7))), wherein, in the content ratio $R_W$ of the binder resin to the release agent (binder resin/release agent) in the white toner particles, and in the content ratio $R_C$ of the binder resin to the release agent (binder resin/release agent) in the color toner particles, a relationship of $1.0 < R_C - R_W < 6.0$ is satisfied.

(((9)))

The electrostatic charge image developing toner set according to (((8))), wherein the content ratio $R_W$ of the binder resin to the release agent (binder resin/release agent) in the white toner particles is 6 or more and less than 10.

(((10)))

The electrostatic charge image developing toner set according to any one of (((1))) to (((9))), wherein, in a case where a ratio of a content ratio $R_W$ of the binder resin to the release agent (binder resin/release agent) in the white toner particles to a volume-average particle size $D_W$ of the white toner particles is represented by $R_W/D_W$, and a ratio of a content ratio $R_C$ of the binder resin to the release agent (binder resin/release agent) in the color toner particles to a volume-average particle size $D_C$ of the color toner particles is represented by $R_W/D_C$, a relationship of $R_W/D_W < R_C/D_C$ is satisfied.

(((11)))

The electrostatic charge image developing toner set according to (((1))), wherein, in a case where a loss elastic modulus of the white toner at 70° C. is represented by $G''[W70]$ and a loss elastic modulus of the color toner at 70° C. is represented by $G''[C70]$, a relationship of $0.1 \le G''[W70]/G''[C70] \le 100$ is satisfied, a storage elastic modulus $G'[W60]$ of the white toner at 60° C. is $G'[W60] \ge 10^7$ Pa, and in a case where the storage elastic modulus of the white toner at 60° C. is represented by $G'[W60]$ and a storage elastic modulus of the color toner at 60° C. is represented by $G'[C60]$, a relationship of $50 \le G'[W60]/G'[C60]$ is satisfied.

(((12)))

An electrostatic charge image developer set comprising:

a white electrostatic charge image developer that contains the white toner in the electrostatic charge image developing toner set according to any one of (((1))) to (((11))); and a color electrostatic charge image developer that contains the color toner in the electrostatic charge image developing toner set according to any one of (((1))) to (((11))).

(((13)))

A toner cartridge set comprising:

a white toner cartridge including a container that contains the white toner in the electrostatic charge image developing toner set according to any one of (((1))) to (((11))), and is detachable from an image forming apparatus; and a color toner cartridge including a container that contains the color toner in the electrostatic charge image developing toner set according to any one of (((1))) to (((11))), and is detachable from the image forming apparatus.

(((14)))

A process cartridge comprising:

a first developing unit that contains the white electrostatic charge image developer in the electrostatic charge image developer set according to (((12))); and a second developing unit that contains the color electrostatic charge image developer in the electrostatic charge image developer set according to (((12))), wherein the process cartridge is detachable from an image forming apparatus.

(((15)))

An image forming apparatus comprising:

a first image forming unit that forms a white image by the white toner in the electrostatic charge image developing toner set according to any one of (((1))) to (((11)));

a second image forming unit that forms a colored image by the color toner in the electrostatic charge image developing toner set according to any one of (((1))) to (((11)));

a transfer unit that transfers the white image and the colored image to a surface of a recording medium; and a fixing unit that fixes the white image and the colored image transferred to the surface of the recording medium.

(((16)))

An image forming method comprising:

forming a white image by the white toner in the electrostatic charge image developing toner set according to any one of (((1))) to (((11)));

forming a colored image by the color toner in the electrostatic charge image developing toner set according to any one of (((1))) to (((11)));

transferring the white image and the colored image to a surface of a recording medium; and fixing the white image and the colored image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner set comprising:

a white toner that contains white toner particles including a binder resin, a white colorant, and a release agent; and a non-white color toner that contains color toner particles including a binder resin, a color colorant, and a release agent, wherein in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, a relationship of $W_C < W_W$ is satisfied, wherein $W_W$ and $W_C$ are determined from cross-sectional images of the white toner particles and the color toner particles, respectively.

2. The electrostatic charge image developing toner set according to claim 1, wherein, in the proportion $W_W$ of the area of the domain of the release agent present in the surface layer region of the white toner particles, and in the proportion $W_C$ of the area of the domain of the release agent present in the surface layer region of the color toner particles, a relationship of $0.0\% < W_W - W_C < 60.0\%$ is satisfied.

3. The electrostatic charge image developing toner set according to claim 2, wherein the proportion $W_W$ of the area of the domain of the release agent present in the surface layer region of the white toner particles is 30.0% or more and 70.0% or less.

4. The electrostatic charge image developing toner set according to claim 1, wherein, in a case where a melting temperature of the release agent in the white toner particles is represented by $Tm_W$, and a melting temperature of the release agent in the color toner particles is represented by $Tm_C$, a relationship of $Tm_W < Tm_C$ is satisfied.

5. The electrostatic charge image developing toner set according to claim 4, wherein, in the melting temperature $Tm_W$ of the release agent in the white toner particles, and in the melting temperature $Tm_C$ of the release agent in the color toner particles, a relationship of $10°$ C. $\leq Tm_C - Tm_W < 30°$ C. is satisfied.

6. The electrostatic charge image developing toner set according to claim 5, wherein the melting temperature $Tm_W$ of the release agent in the white toner particles is 70° C. or higher and 90° C. or lower.

7. The electrostatic charge image developing toner set according to claim 1, wherein, in a case where a content ratio of the binder resin to the release agent (binder resin/release agent) in the white toner particles is represented by $R_W$, and a content ratio of the binder resin to the release agent (binder resin/release agent) in the color toner particles is represented by $R_C$, a relationship of $R_W < R_C$ is satisfied.

8. The electrostatic charge image developing toner set according to claim 7, wherein, in the content ratio $R_W$ of the binder resin to the release agent (binder resin/release agent) in the white toner particles, and in the content ratio $R_C$ of the binder resin to the release agent (binder resin/release agent) in the color toner particles, a relationship of $1.0 < R_C - R_W < 6.0$ is satisfied.

9. The electrostatic charge image developing toner set according to claim 8, wherein the content ratio $R_W$ of the binder resin to the release agent (binder resin/release agent) in the white toner particles is 6 or more and less than 10.

10. The electrostatic charge image developing toner set according to claim 1, wherein, in a case where a ratio of a content ratio $R_W$ of the binder resin to the release agent (binder resin/release agent) in the white toner particles to a volume-average particle size $D_W$ of the white toner particles is represented by $R_W/D_W$, and a ratio of a content ratio $R_C$ of the binder resin to the release agent (binder resin/release agent) in the color toner particles to a volume-average particle size $D_C$ of the color toner particles is represented by $R_W/D_C$, a relationship of $R_W/D_W < R_C/D_C$ is satisfied.

11. The electrostatic charge image developing toner set according to claim 1, wherein, in a case where a loss elastic modulus of the white toner at 70° C. is represented by $G''[W70]$ and a loss elastic modulus of the color toner at 70° C. is represented by $G''[C70]$, a relationship of $0.1 \leq G''[W70]/G''[C70] \leq 100$ is satisfied, a storage elastic modulus $G'[W60]$ of the white toner at 60° C. is $G'[W60] \geq 10^7$ Pa, and in a case where the storage elastic modulus of the white toner at 60° C. is represented by $G'[W60]$ and a storage elastic modulus of the color toner at 60° C. is represented by $G'[C60]$, a relationship of $50 \leq G'[W60]/G'[C60]$ is satisfied.

12. An electrostatic charge image developer set comprising:

the electrostatic charge image developing toner set according to claim 1;

a white electrostatic charge image developer that contains the white toner in the electrostatic charge image developing toner set; and a color electrostatic charge image developer that contains the non-white color toner in the electrostatic charge image developing toner set.

13. An electrostatic charge image developer set comprising:

the electrostatic charge image developing toner set according to claim 2;

a white electrostatic charge image developer that contains the white toner in the electrostatic charge image developing toner set; and a color electrostatic charge image developer that contains the non-white color toner in the electrostatic charge image developing toner set.

14. An electrostatic charge image developer set comprising:

the electrostatic charge image developing toner set according to claim 3;

a white electrostatic charge image developer that contains the white toner in the electrostatic charge image developing toner set; and a color electrostatic charge image developer that contains the non-white color toner in the electrostatic charge image developing toner set.

15. An electrostatic charge image developer set comprising:

the electrostatic charge image developing toner set according to claim 4;

a white electrostatic charge image developer that contains the white toner in the electrostatic charge image developing toner set; and a color electrostatic charge image developer that contains the non-white color toner in the electrostatic charge image developing toner set.

16. An electrostatic charge image developer set comprising:

the electrostatic charge image developing toner set according to claim 5;

a white electrostatic charge image developer that contains the white toner in the electrostatic charge image developing toner set; and a color electrostatic charge image developer that contains the non-white color toner in the electrostatic charge image developing toner set.

17. A toner cartridge set comprising:

the electrostatic charge image developing toner set according to claim 1;

a white toner cartridge including a container that contains the white toner in the electrostatic charge image developing toner set, and is detachable from an image forming apparatus; and a color toner cartridge including a container that contains the non-white color toner in the electrostatic charge image developing toner set, and is detachable from the image forming apparatus.

18. A process cartridge comprising:

the electrostatic charge image developer set according to claim 12;

a first developing unit that contains the white electrostatic charge image developer in the electrostatic charge image developer set; and a second developing unit that contains the color electrostatic charge image developer in the electrostatic charge image developer set, wherein the process cartridge is detachable from an image forming apparatus.

19. An image forming apparatus comprising:

the electrostatic charge image developing toner set according to claim 1;

a first image forming unit that forms a white image by the white toner in the electrostatic charge image developing toner set;

a second image forming unit that forms a colored image by the non-white color toner in the electrostatic charge image developing toner set;

a transfer unit that transfers the white image and the colored image to a surface of a recording medium; and a fixing unit that fixes the white image and the colored image transferred to the surface of the recording medium.

20. An image forming method comprising:

forming a white image by a white toner that contains white toner particles including a binder resin, a white colorant, and a release agent;

forming a colored image by a non-white color toner that contains color toner particles including a binder resin, a color colorant, and a release agent;

transferring the white image and the colored image to a surface of a recording medium; and fixing the white image and the colored image transferred to the surface of the recording medium, wherein in a case where a proportion of an area of a domain of a release agent present in a surface layer region from a surface of the white toner particles to a depth of 1 μm or less with respect to an area of all domains of the release agent present in a cross section of the white toner particles is represented by $W_W$, and a case where a proportion of an area of a domain of a release agent present in a surface layer region from a surface of the color toner particles to a depth of 1 μm or less with respect to an area of all domains of the release agent present in a cross section of the color toner particles is represented by $W_C$, a relationship of $W_C < W_W$ is satisfied, wherein $W_W$ and $W_C$ are determined from cross-sectional images of the white toner particles and the color toner particles, respectively.

* * * * *